United States Patent [19]

Minor et al.

[11] Patent Number: 5,607,616
[45] Date of Patent: Mar. 4, 1997

[54] AZEOTROPE(LIKE) COMPOSITIONS WITH FLUOROMETHYL TRIFLUOROMETHYL ETHER AND DIMETHYL ETHER

[75] Inventors: Barbara H. Minor, Elkton, Md.; Tuneen E. C. Chisolm, Newark; Glenn S. Shealy, Hockessin, both of Del.

[73] Assignee: E. I. Du Pont de Nemours and Company, Wilmington, Del.

[21] Appl. No.: 485,261

[22] Filed: Jun. 7, 1995

Related U.S. Application Data

[60] Division of Ser. No. 242,511, May 13, 1994, Pat. No. 5,484,546, which is a continuation-in-part of Ser. No. 64,183, May 19, 1993, abandoned.

[51] Int. Cl.$^6$ ............... C09K 5/04; C11D 7/50; C11D 7/26; C11D 7/28
[52] U.S. Cl. ............... 252/67; 510/411; 62/114; 62/324.1
[58] Field of Search ............... 252/67, 170, 171, 252/305, DIG. 9; 264/DIG. 5; 62/114, 324.1; 510/411

[56] References Cited

U.S. PATENT DOCUMENTS

| | | | |
|---|---|---|---|
| 3,362,180 | 1/1968 | Eiseman | 61/112 |
| 3,394,878 | 7/1968 | Eiseman | 252/67 |
| 3,903,012 | 9/1975 | Brandreth | 252/194 |
| 4,041,148 | 8/1977 | Simons et al. | 424/45 |
| 4,559,154 | 12/1985 | Powell | 252/69 |
| 4,961,321 | 10/1990 | O'Neill | 62/114 |
| 5,023,009 | 6/1991 | Merchant | 252/171 |
| 5,137,932 | 8/1992 | Behme et al. | 521/131 |
| 5,169,873 | 12/1992 | Behme et al. | 521/114 |
| 5,188,748 | 2/1993 | Arnaud et al. | 252/67 |
| 5,264,462 | 11/1993 | Hodson et al. | 521/88 |
| 5,433,880 | 7/1995 | Minor et al. | 252/67 |
| 5,458,798 | 10/1995 | Lunger et al. | 252/67 |
| 5,541,943 | 7/1996 | Powell | 252/67 |

FOREIGN PATENT DOCUMENTS

| | | |
|---|---|---|
| 2089860 | 8/1993 | Canada. |
| 416777 | 8/1990 | European Pat. Off.. |
| 450855 | 3/1991 | European Pat. Off.. |
| 510295A2 | 1/1992 | European Pat. Off.. |
| 574897 | 6/1993 | European Pat. Off.. |
| 2-272086 | 1/1990 | Japan. |
| 3093883A | 4/1991 | Japan. |
| 3093886A | 4/1991 | Japan. |
| 3093882A | 4/1991 | Japan. |
| 04110386 | 4/1992 | Japan. |
| 5085970A | 4/1993 | Japan. |
| 05202220-A | 8/1993 | Japan. |
| 05222235-A | 8/1993 | Japan. |
| 2274462 | 7/1994 | United Kingdom. |
| 93/11201 | 6/1983 | WIPO. |
| WO93/04138 | 3/1993 | WIPO. |
| 93/12102 | 6/1993 | WIPO. |
| 93/14175 | 7/1993 | WIPO. |

OTHER PUBLICATIONS

Devotta et al., Assessment of HFCs, Fluorinated Ethers and Amine as Alternatives to CFC12, *Int. J. Refrig.*, 16, No. 2, 84–90, 1993.

Kopko, Beyond CFCs: Extending the Search for New Refrigerants*, ASHRAE CFC Technology Conference, Gaithersburg, MD, 79–85, Sep. 27–28, 1989.

Adcock et al., Fluorinated Ethers: A "New" Series of CFC Substitutes, Department of Chemistry, The University of Tennessee, Knoxville, TN, 1–16, Feb. 1991.

PCT International Search Report, international application No. PCT/US94/05653, international filing date May 19, 1994.

*Primary Examiner*—Douglas J. McGinty

[57] ABSTRACT

Refrigerant compositions include mixtures of hexafluorodimethyl ether and cyclopropane, dimethylether or propylene; bis(difluoromethyl) ether and 2,2,3,4,4-pentafluorooxetane; fluoromethyl trifluoromethyl ether and 2,2,4,4,5,5-hexafluoro-1,3-dioxolane, 1-trifluoromethoxy-1,2,2,2-tetrafluoroethane, dimethylether or tris(trifluoromethyl)amine; trifluoromethyl methyl ether and perfluorooxetane, 2,2,4,4,5,5-hexafluoro-1,3-dioxolane, perfluoromethyl ethyl ether, perfluorodimethoxymethane, 1-trifluoromethoxy-1,2,2,2-tetrafluoroethane, dimethylether or tris(trifluoromethyl)amine; perfluoromethyl ethyl ether and dimethylether, propylene or 1-trifluoromethoxy-1,2,2,2-tetrafluoroethane; perfluorodimethoxymethane and dimethylether or isobutane; 1-trifluoromethoxy-1,1,2,2-tetrafluoroethane and tris(trifluoromethyl)amine or dimethylether; difluoromethoxy pentafluoroethane and dimethylether, isobutane or tris(trifluoromethyl)amine; 1-trifluoromethoxy-1,2,2,2-tetrafluoroethane and dimethylether or isobutane; 1-difluoromethoxy-1,1,2,2-tetrafluoroethane and $N(CHF_2)_2(CF_3)$; or 1,1,1,2,2,3,3-heptafluoro-3-(1,2,2,2-tetrafluoroethoxy)propane and 1,1,2,2,3-pentafluoropropane or 1,1,1,2,3-pentafluoropropane.

7 Claims, 29 Drawing Sheets

AZEOTROPE(LIKE) COMPOSITIONS WITH FLUOROMETHYL TRIFLUOROMETHYL ETHER AND DIMETHYL ETHER

CROSS-REFERENCE TO EARLIER FILED APPLICATION

This is a division of application Ser. No. 08/242,511, filed May 13, 1994, now U.S. Pat. No. 5,484,546, which is a continuation-in-part of U.S. application Ser. No. 08/064,183, filed May 19, 1993, now abandoned.

FIELD OF THE INVENTION

This invention relates to refrigerant compositions that include at least one acyclic fluoroether. These compositions are useful as cleaning agents, expansion agents for polyolefins and polyurethanes, aerosol propellants, refrigerants, heat transfer media, gaseous dielectrics, fire extinguishing agents, power cycle working fluids, polymerization media, particulate removal fluids, carrier fluids, buffing abrasive agents, and displacement drying agents.

BACKGROUND OF THE INVENTION

Fluorinated hydrocarbons have many uses, one of which is as a refrigerant. Such refrigerants include trichlorofluoromethane (CFC-11) dichlorodifluoromethane (CFC-12) and chlorodifluoromethane (HCFC-22).

In recent years it has been pointed out that certain kinds of fluorinated hydrocarbon refrigerants released into the atmosphere may adversely affect the stratospheric ozone layer. Although this proposition has not yet been completely established, there is a movement toward the control of the use and the production of certain chlorofluorocarbons (CFCs) and hydrochlorofluorocarbons (HCFCs) under an international agreement.

Accordingly, there is a demand for the development of refrigerants that have a lower ozone depletion potential than existing refrigerants while still achieving an acceptable performance in refrigeration applications.

In refrigeration applications, a refrigerant is often lost during operation through leaks in shaft seals, hose connections, soldered joints and broken lines. In addition, the refrigerant may be released to the atmosphere during maintenance procedures on refrigeration equipment. If the refrigerant is not a pure component or an azeotropic or azeotrope-like composition, the refrigerant composition may change when leaked or discharged to the atmosphere from the refrigeration equipment, which may cause the refrigerant to become flammable or to have poor refrigeration performance.

Accordingly, it is desirable, if possible, to use as a refrigerant a single compound or an azeotropic or azeotrope-like composition of more than one compound.

It is also desirable to find replacements for CFCs and HCFCs for use as a cleaning agent or solvent to clean, for example, electronic circuit boards. It is preferred that the cleaning agents be azeotropic or azeotrope-like because in vapor degreasing operations the cleaning agent is generally redistilled and reused for final rinse cleaning.

Replacements for CFCs and HCFCs may also useful as blowing agents in the manufacture of closed-cell polyurethane, phenolic and thermoplastic foams, as propellants in aerosols, as heat transfer media, gaseous dielectrics, fire extinguishing agents, power cycle working fluids such as for heat pumps, inert media for polymerization reactions, fluids for removing particulates from metal surfaces, as carrier fluids that may be used, for example, to place a fine film of lubricant on metal parts, as buffing abrasive agents to remove buffing abrasive compounds from polished surfaces such as metal, as displacement drying agents for removing water, such as from jewelry or metal parts, as resist developers in conventional circuit manufacturing techniques including chlorine-type developing agents, or as strippers for photoresists when used with, for example, a chlorohydrocarbon such as 1,1,1-trichloroethane or trichloroethylene.

SUMMARY OF THE INVENTION

The present invention relates to the discovery of refrigerant compositions of hexafluorodimethyl ether and cyclopropane, dimethyl ether or propylene; bis(difluoromethyl) ether and 2,2,3,4,4-pentafluorooxetane; fluoromethyl trifluoromethyl ether and 2,2,4,4,5,5-hexafluoro-1,3-dioxolane, 1-trifluoromethoxy-1,2,2,2-tetrafluoroethane, dimethyl ether or tris(trifluoromethyl)amine; trifluoromethyl methyl ether and perfluorooxetane, 2,2,4,4,5,5-hexafluoro-1,3dioxolane, perfluoromethyl ethyl ether, perfluorodimethoxymethane, 1-trifluoromethoxy-1,2,2,2-tetrafluoroethane, dimethyl ether or tris(trifluoromethyl)amine; perfluoromethyl ethyl ether and dimethyl ether or propylene; perfluorodimethoxymethane and dimethyl ether or isobutane; 1-trifluoromethoxy-1,1,2,2-tetrafluoroethane and tris(trifluoromethyl)amine or dimethyl ether; difluoromethoxy pentafluoroethane and dimethyl ether, isobutane or tris(trifluoromethyl)amine; 1-trifluoromethoxy-1,2,2,2-tetrafluoroethane and dimethyl ether or isobutane; 1-difluoromethoxy-1,1,2,2-tetrafluoroethane and $N(CHF_2)_2(CF_3)$; or 1,1,1,2,2,3,3-heptafluoro-3-(1,2,2,2-tetrafluoroethoxy)propane and 1,1,2,2,3-pentafluoropropane or 1,1,1,2,3-pentafluoropropane. This invention also relates to the discovery of effective amounts of the components of these compositions to form azeotropic or azeotrope-like compositions.

These compositions are also useful as cleaning agents, expansion agents for polyolefins and polyurethanes, aerosol propellants, heat transfer media, gaseous dielectrics, fire extinguishing agents, power cycle working fluids, polymerization media, particulate removal fluids, carrier fluids, buffing abrasive agents, and displacement drying agents.

DETAILED DESCRIPTION

Figure 1:
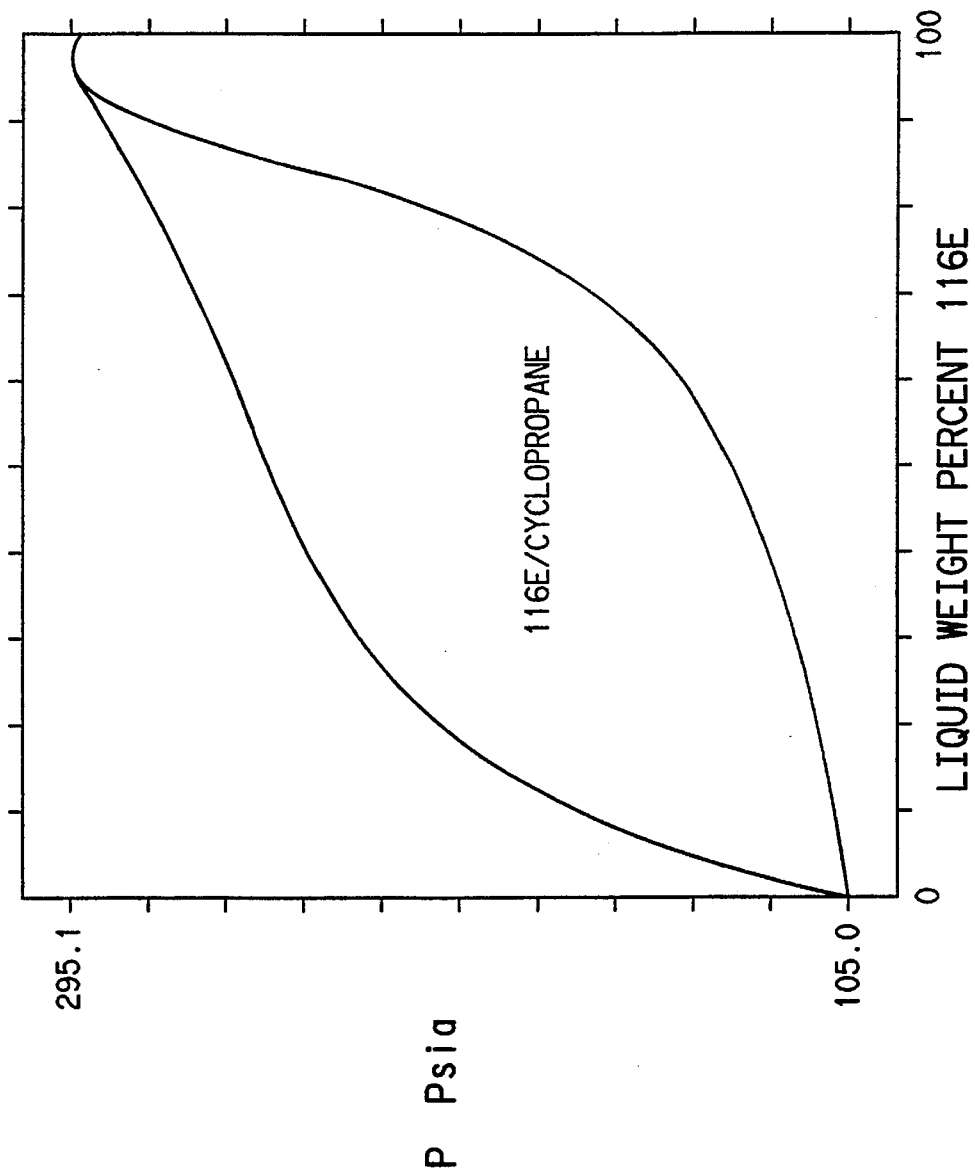
FIG. 1 is a graph of the vapor/liquid equilibrium curve for mixtures of 116E and cyclopropane at 25° C.
Figure 2:
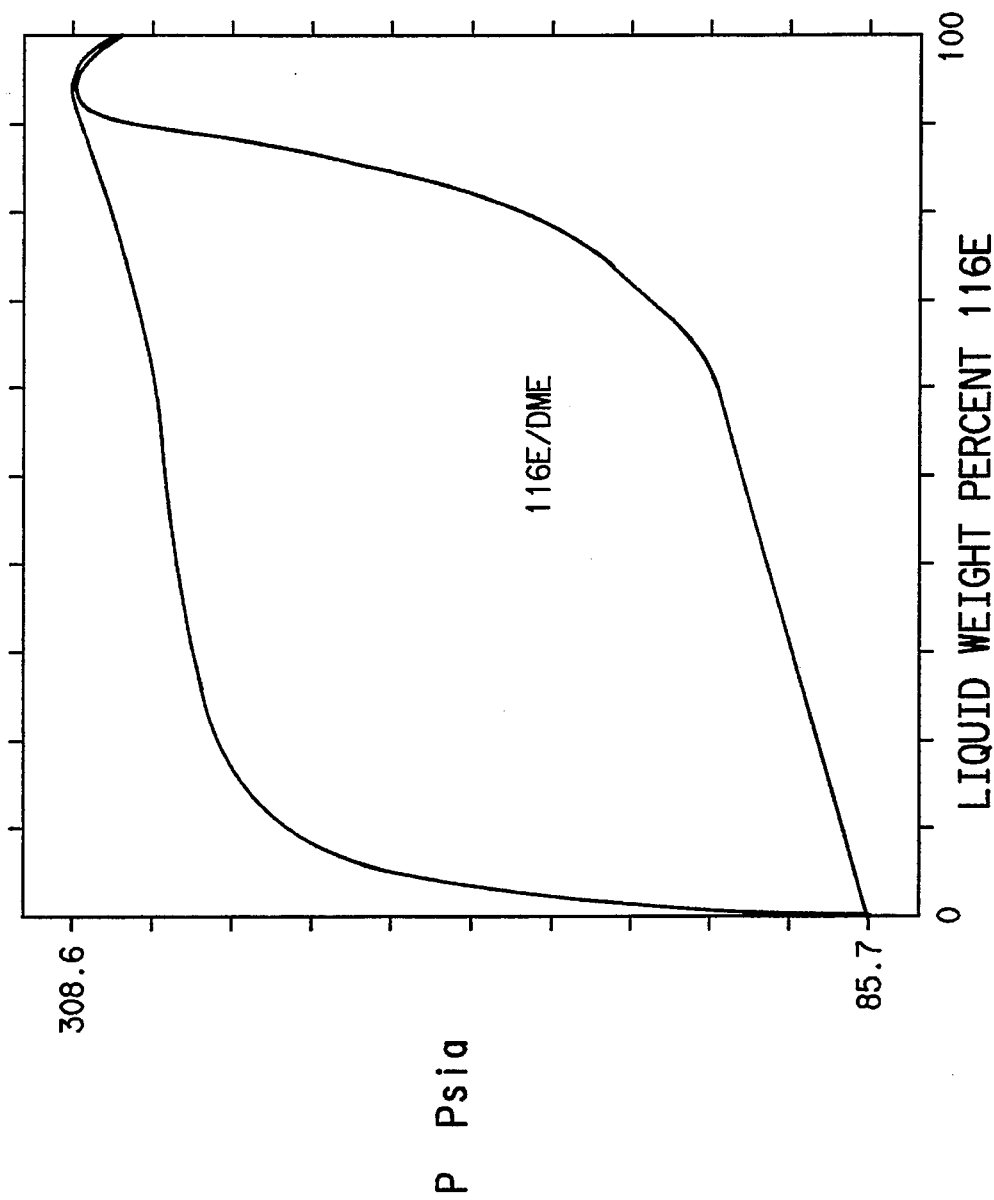
FIG. 2 is a graph of the vapor/liquid equilibrium curve for mixtures of 116E and DME at 25° C.
Figure 3:
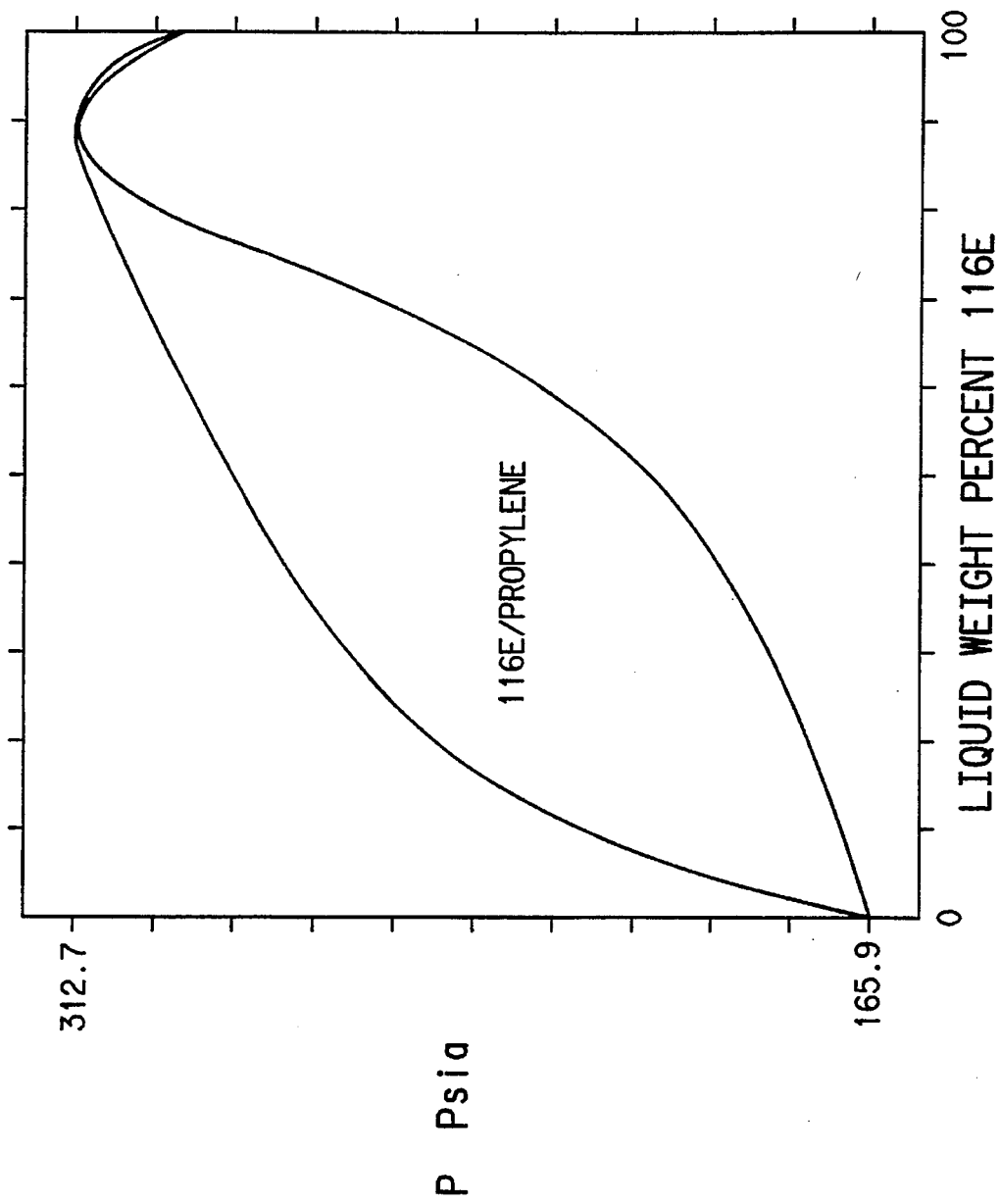
FIG. 3 is a graph of the vapor/liquid equilibrium curve for mixtures of 116E and propylene at 25° C.
Figure 4:
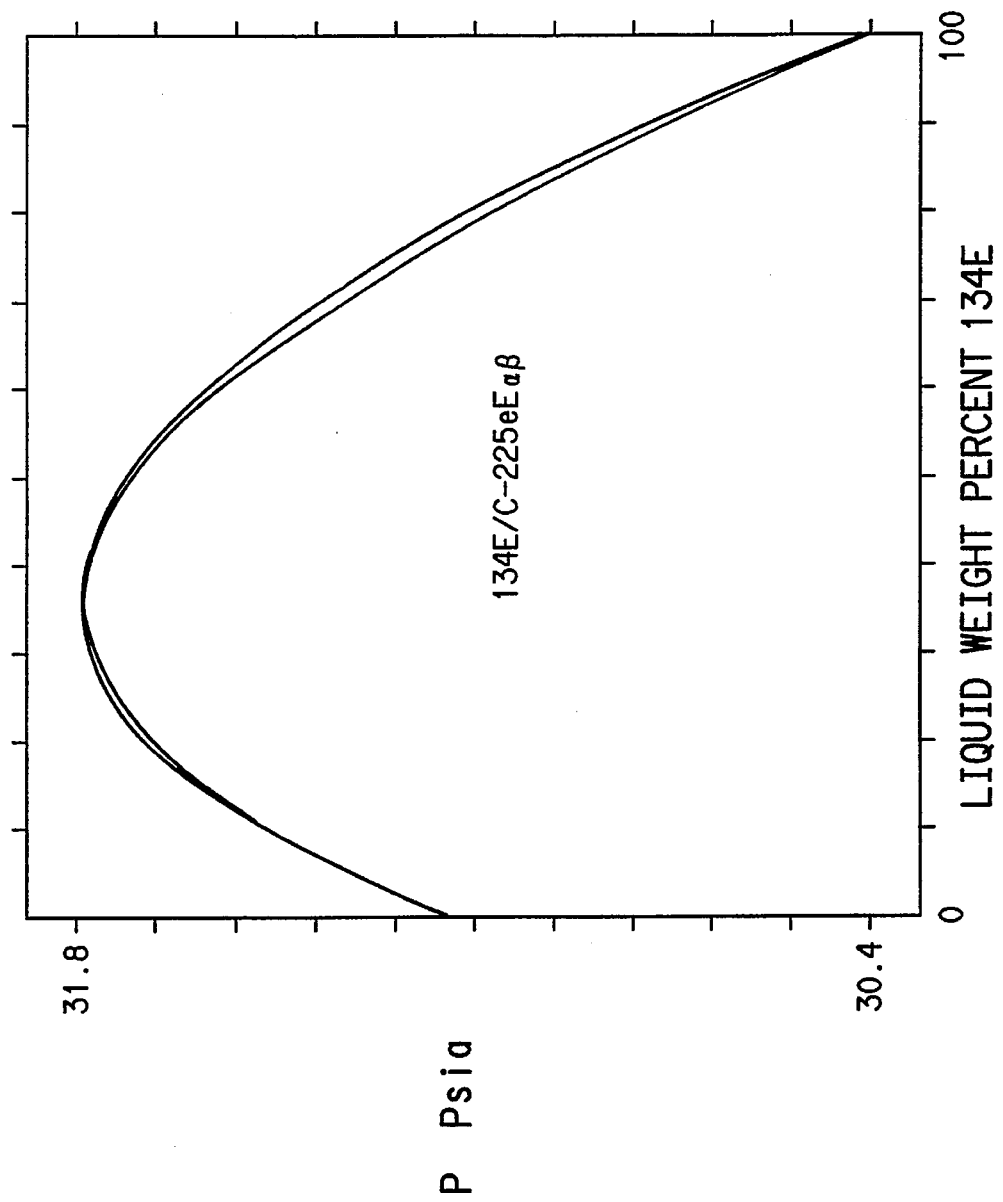
FIG. 4 is a graph of the vapor/liquid equilibrium curve for mixtures of 134E and C-225eEαβ at 25° C.
Figure 5:
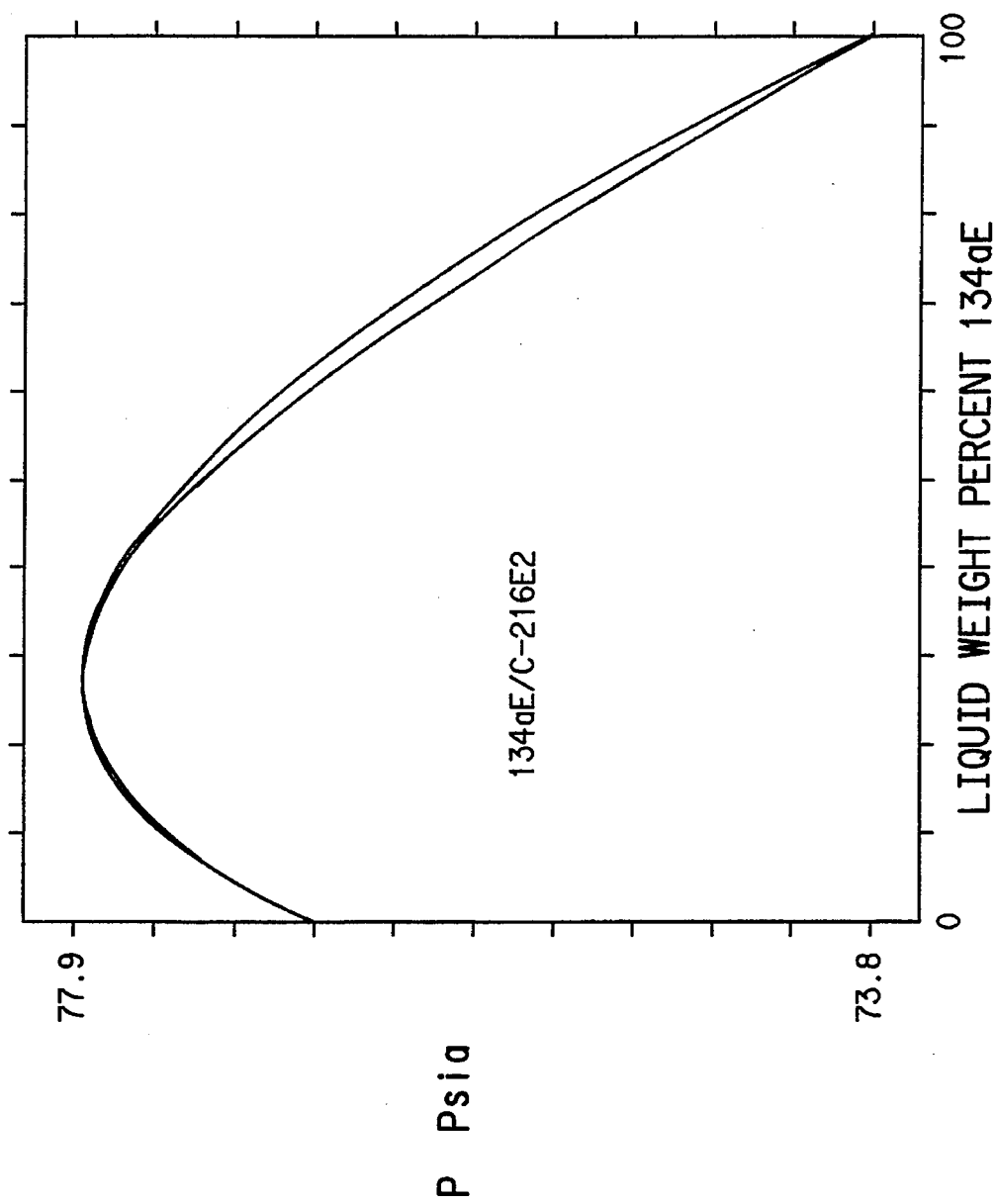
FIG. 5 is a graph of the vapor/liquid equilibrium curve for mixtures of 134aE and C-216E2 at 25° C.
Figure 6:
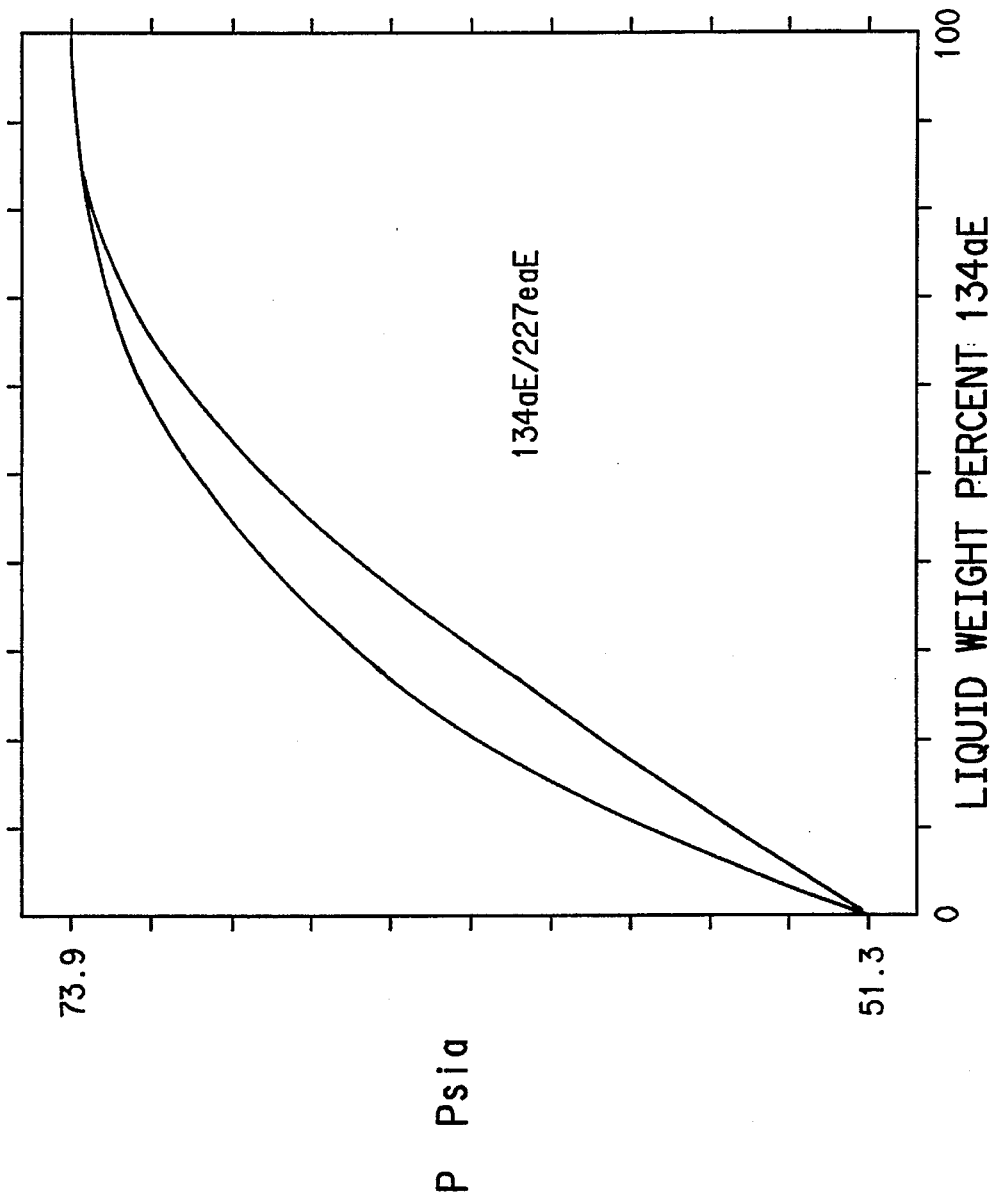
FIG. 6 is a graph of the vapor/liquid equilibrium curve for mixtures of 134aE and 227eaE at 25° C.
Figure 7:
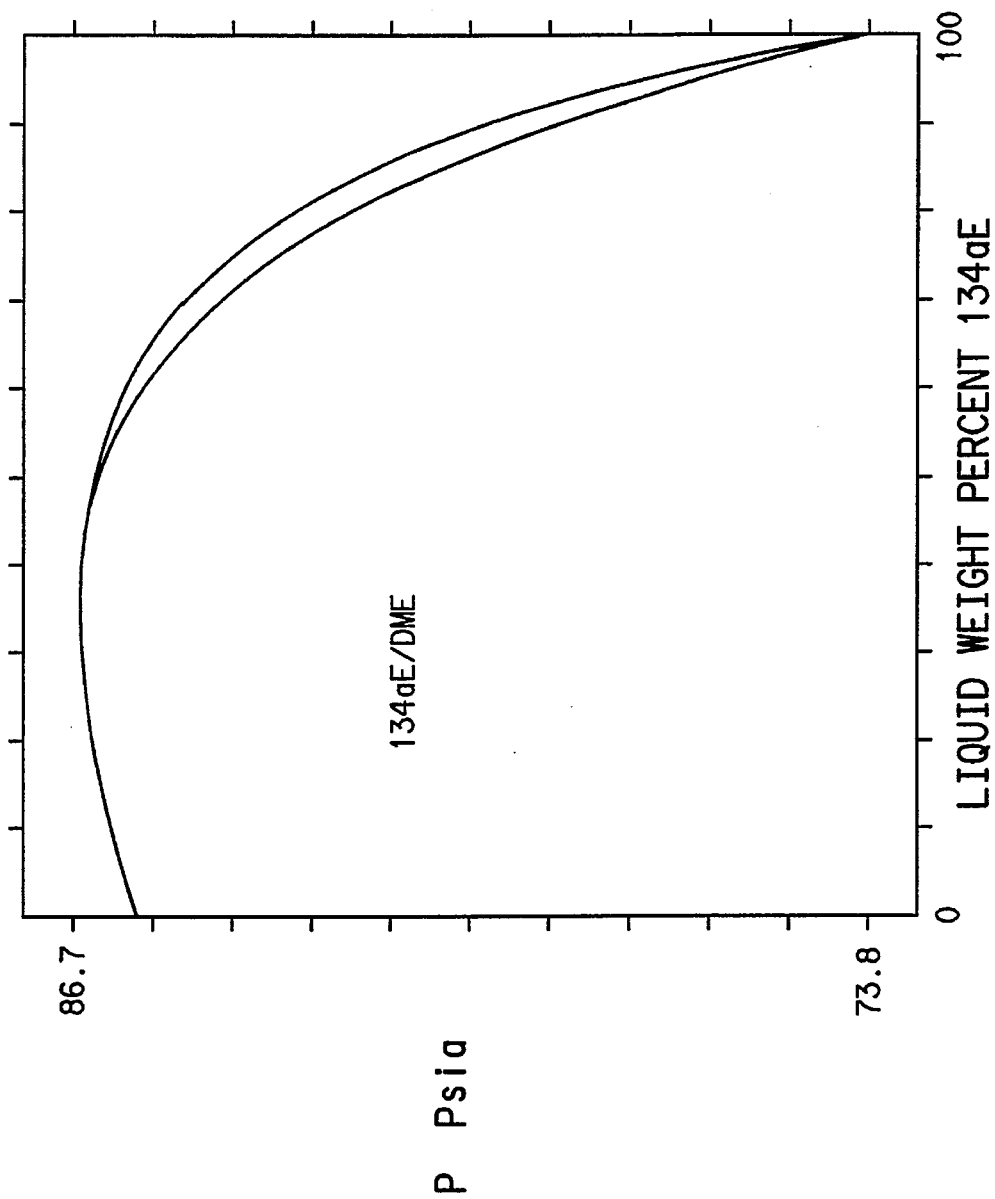
FIG. 7 is a graph of the vapor/liquid equilibrium curve for mixtures of 134aE and DME at 25° C.
Figure 8:
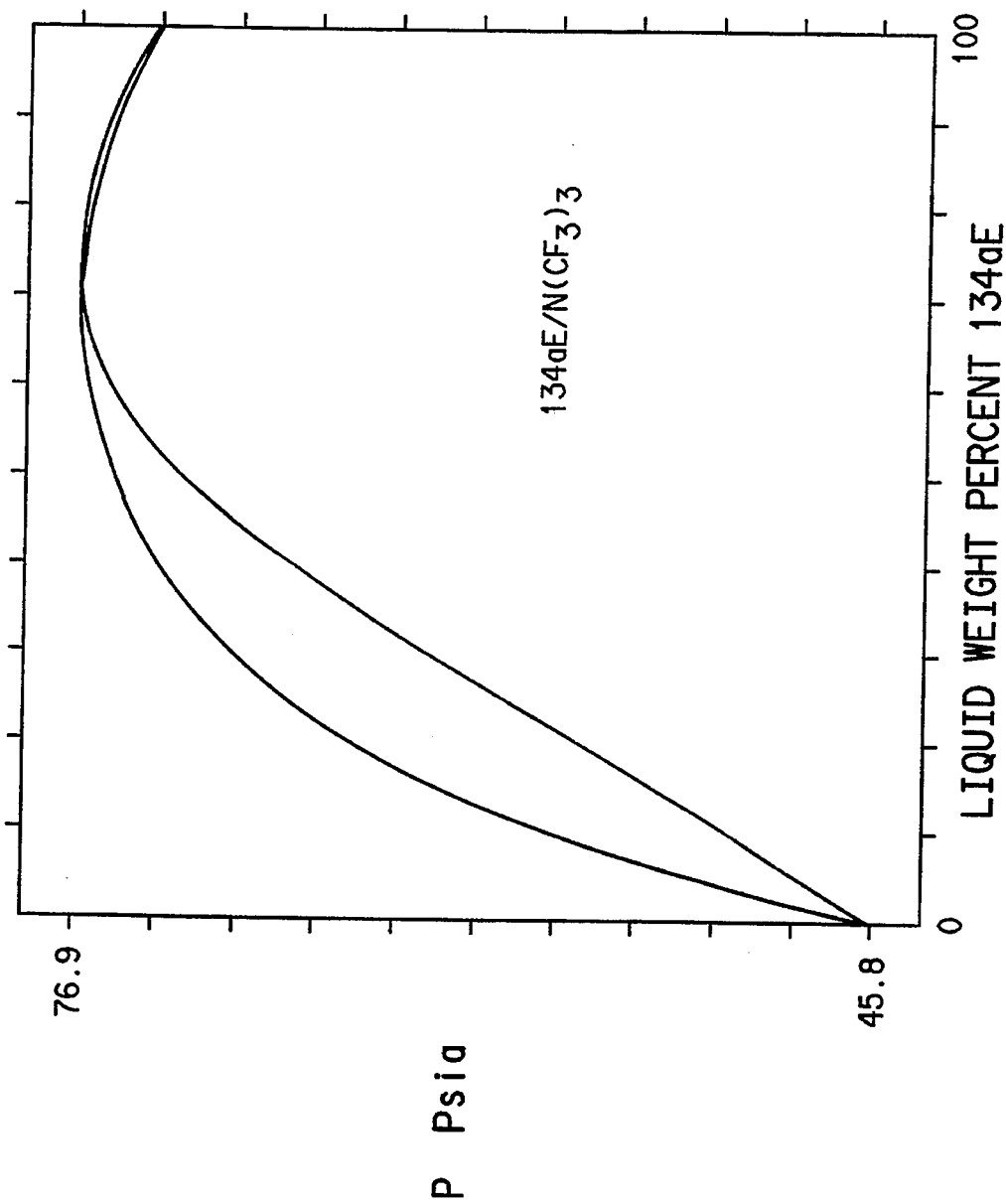
FIG. 8 is a graph of the vapor/liquid equilibrium curve for mixtures of 134aE and $N(CF_3)_3$ at 25° C.
Figure 9:
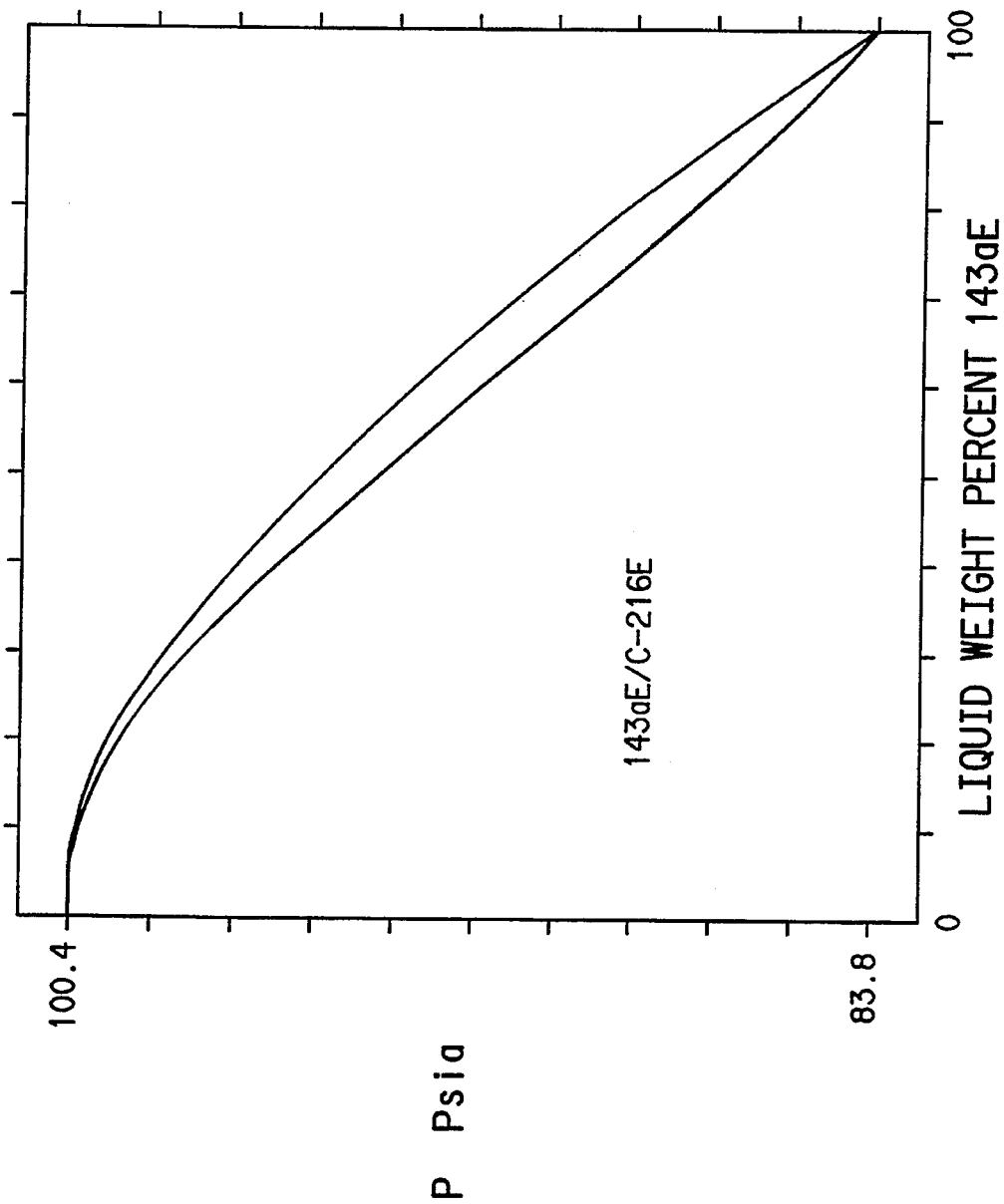
FIG. 9 is a graph of the vapor/liquid equilibrium curve for mixtures of 143aE and C-216E at 25° C.
Figure 10:
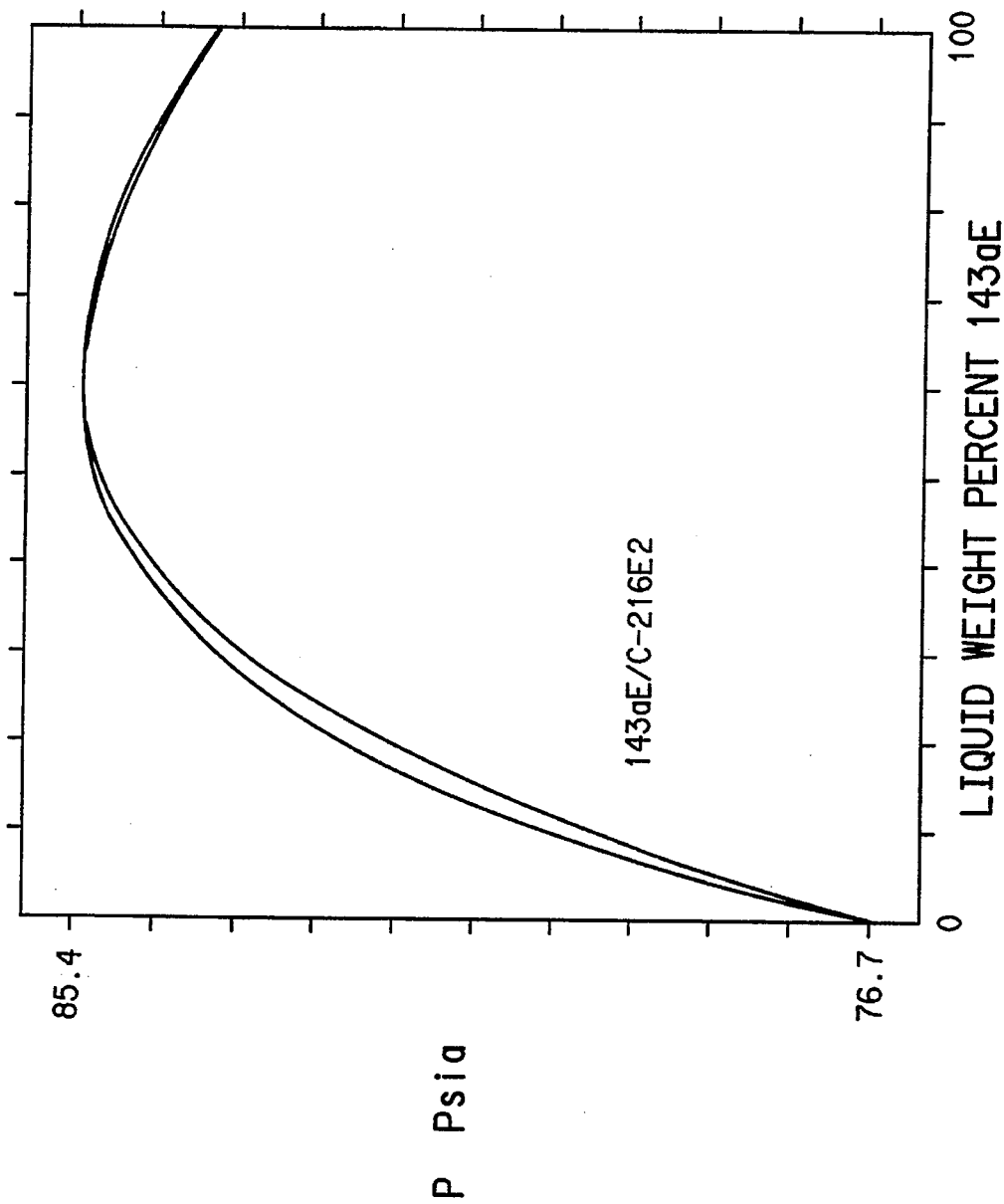
FIG. 10 is a graph of the vapor/liquid equilibrium curve for mixtures of 143aE and C-216E2 at 25° C.
Figure 11:
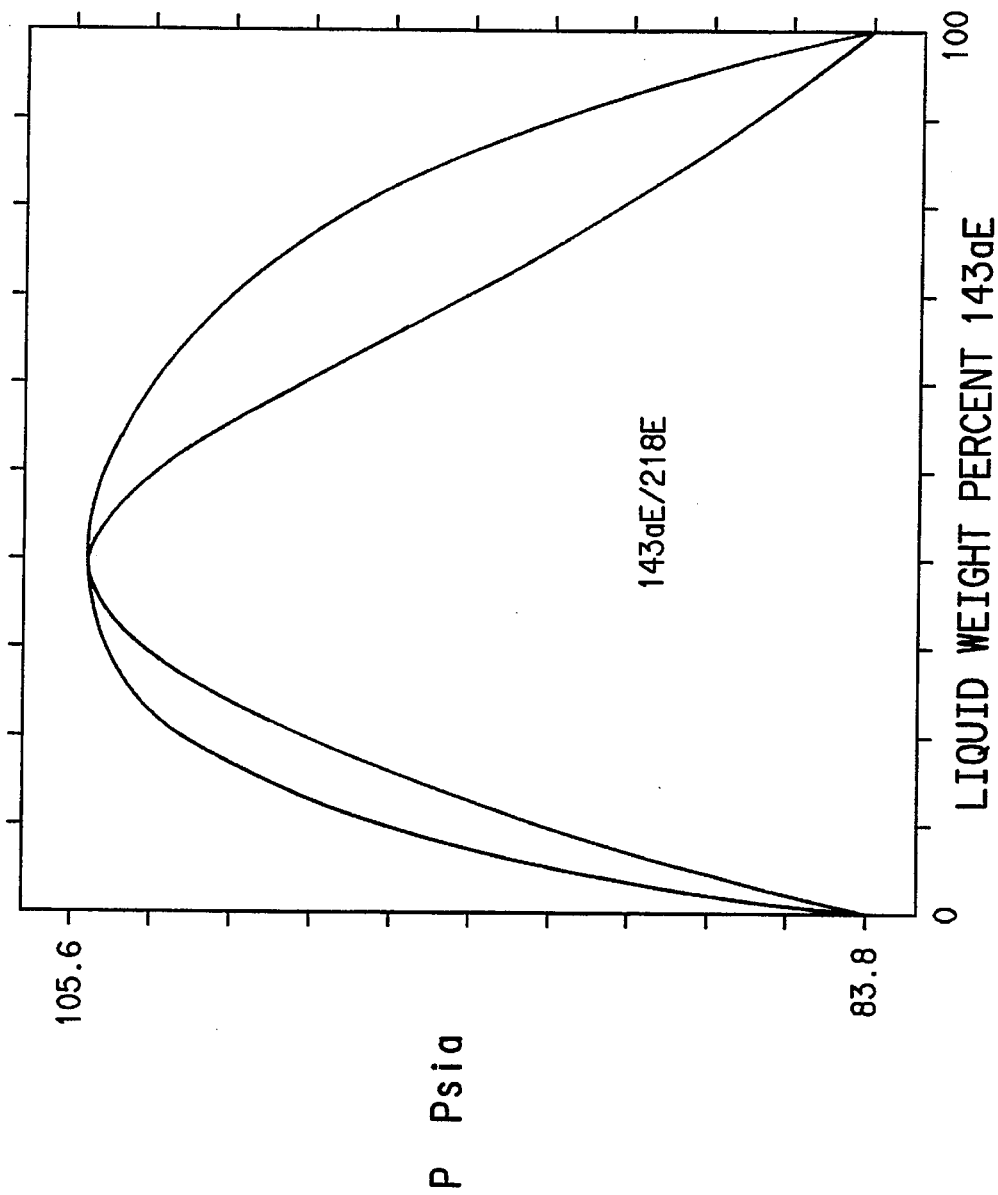
FIG. 11 is a graph of the vapor/liquid equilibrium curve for mixtures of 143aE and 218E at 25° C.
Figure 12:
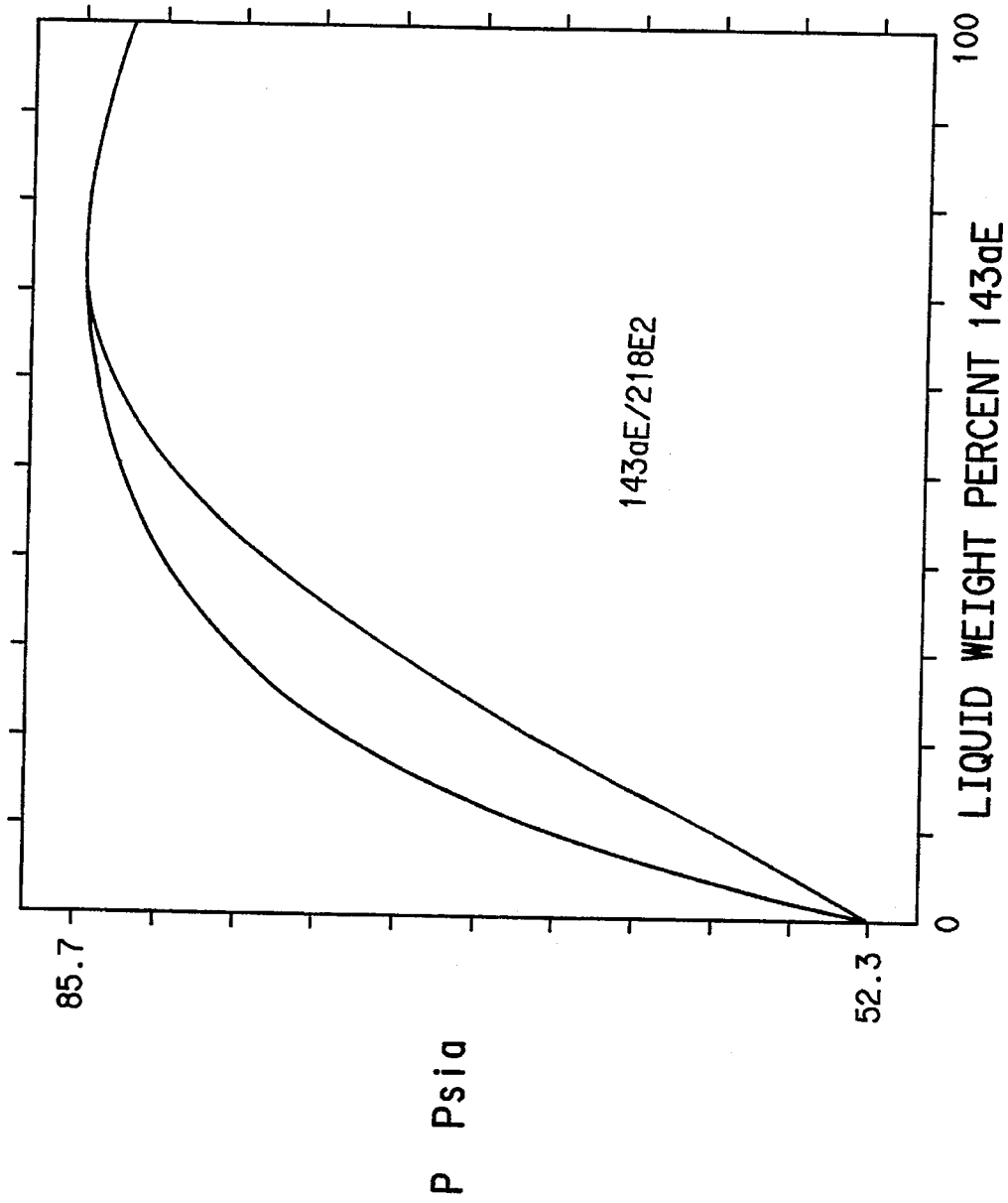
FIG. 12 is a graph of the vapor/liquid equilibrium curve for mixtures of 143aE and 218E2 at 25° C.
Figure 13:
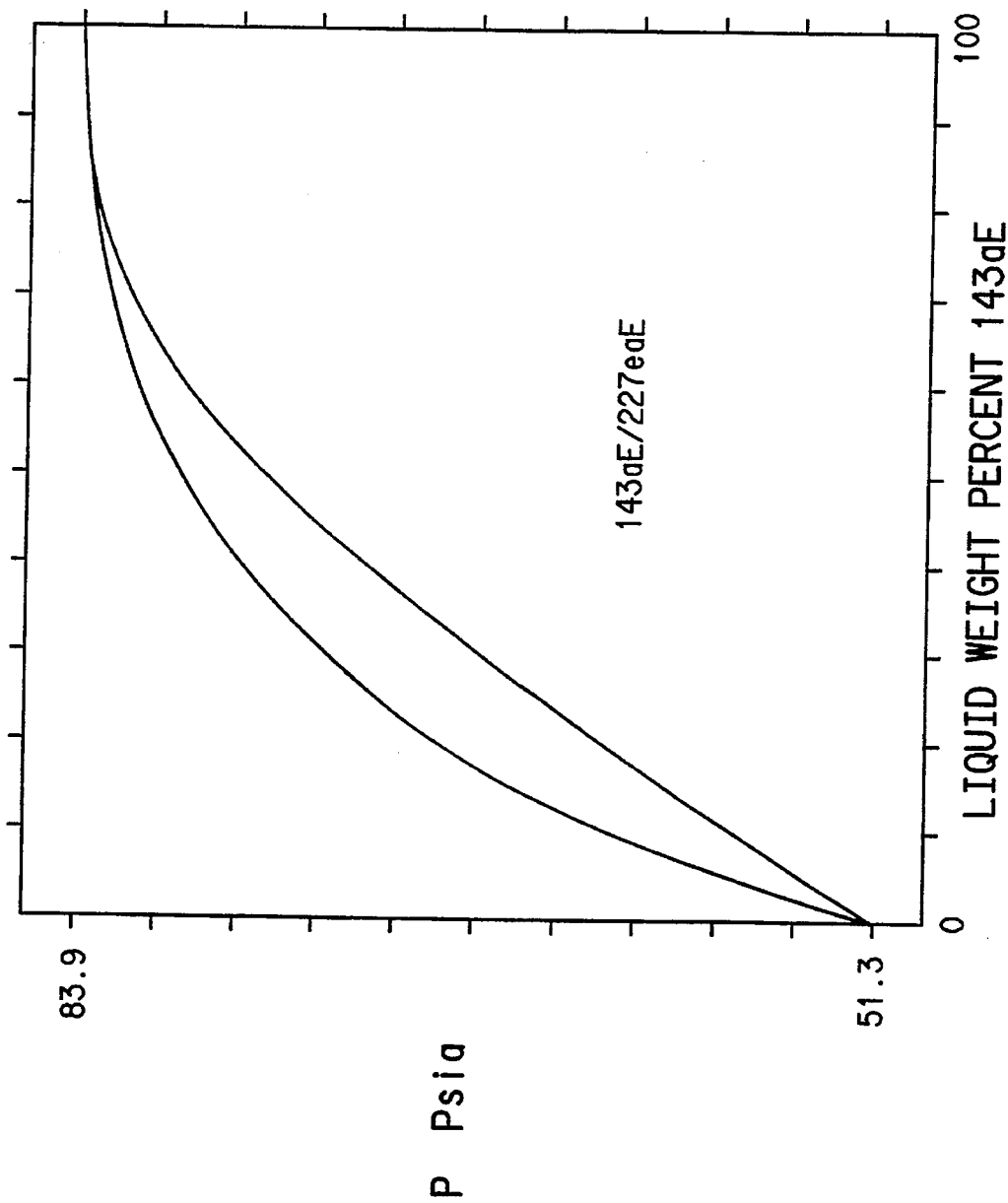
FIG. 13 is a graph of the vapor/liquid equilibrium curve for mixtures of 143aE and 227eaE at 25° C.
Figure 14:
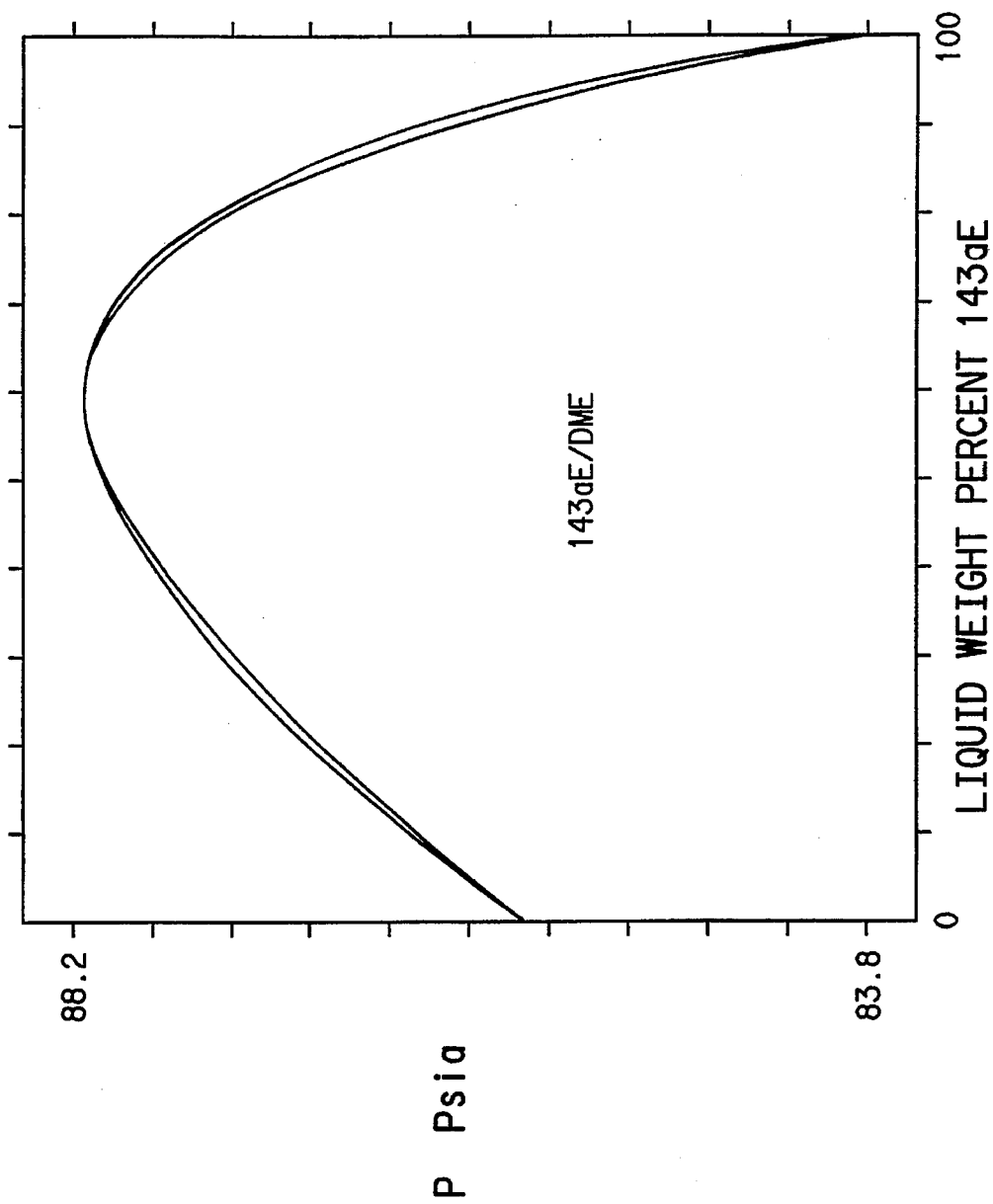
FIG. 14 is a graph of the vapor/liquid equilibrium curve for mixtures of 143aE and DME at 25° C.
Figure 15:
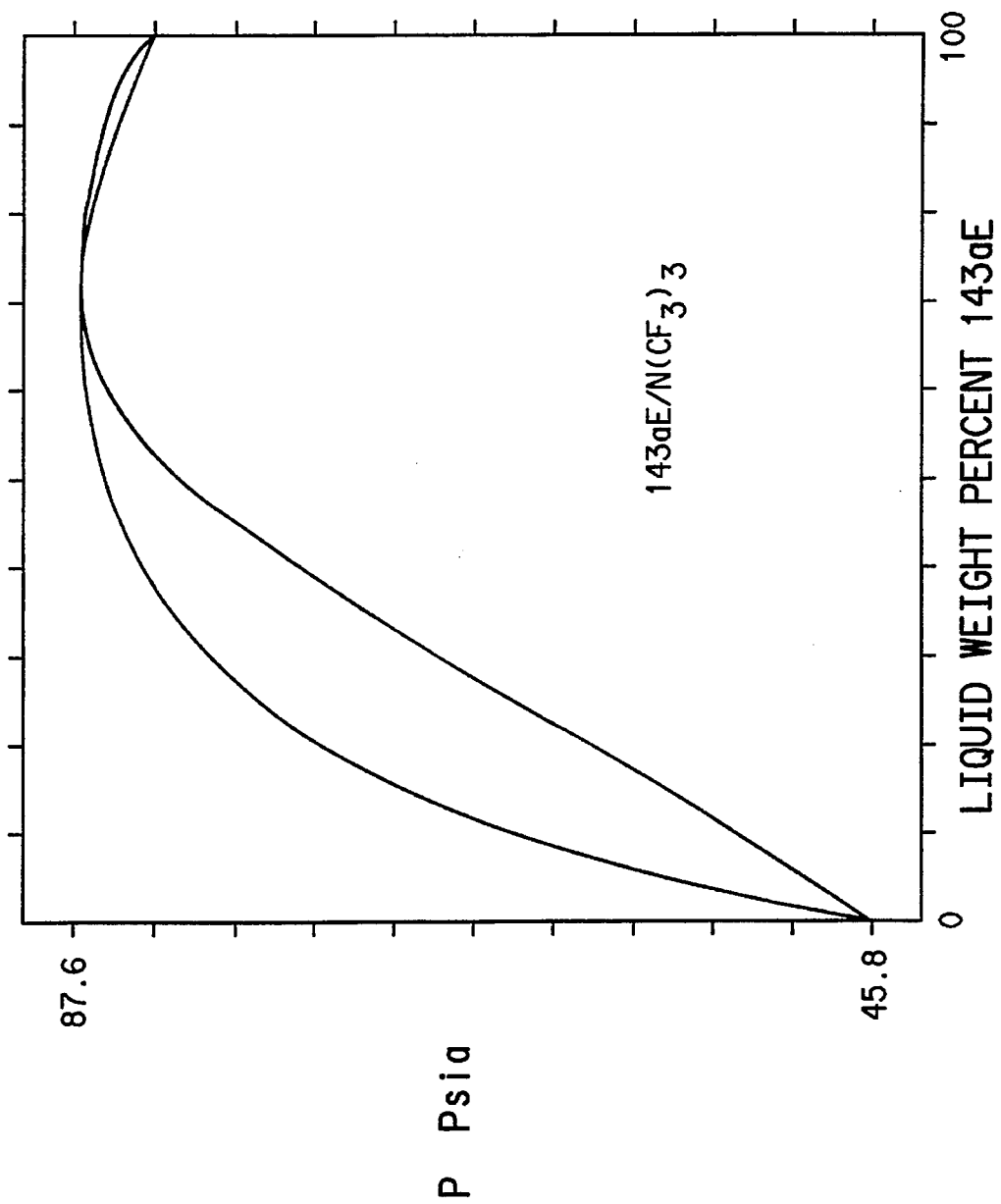
FIG. 15 is a graph of the vapor/liquid equilibrium curve for mixtures of 143aE and $N(CF_3)_3$ at 25° C.
Figure 16:
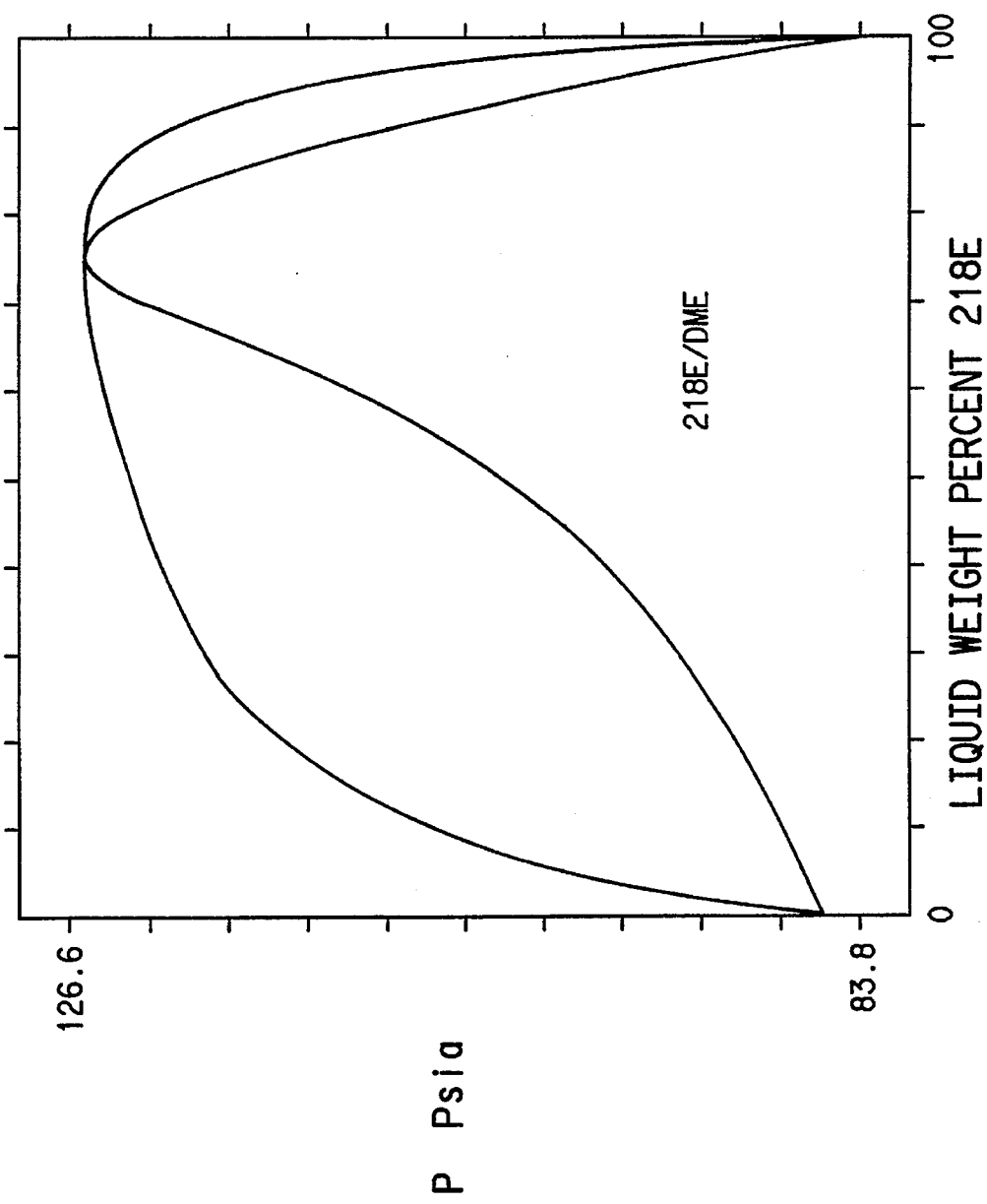
FIG. 16 is a graph of the vapor/liquid equilibrium curve for mixtures of 218E and DME at 25° C.
Figure 17:
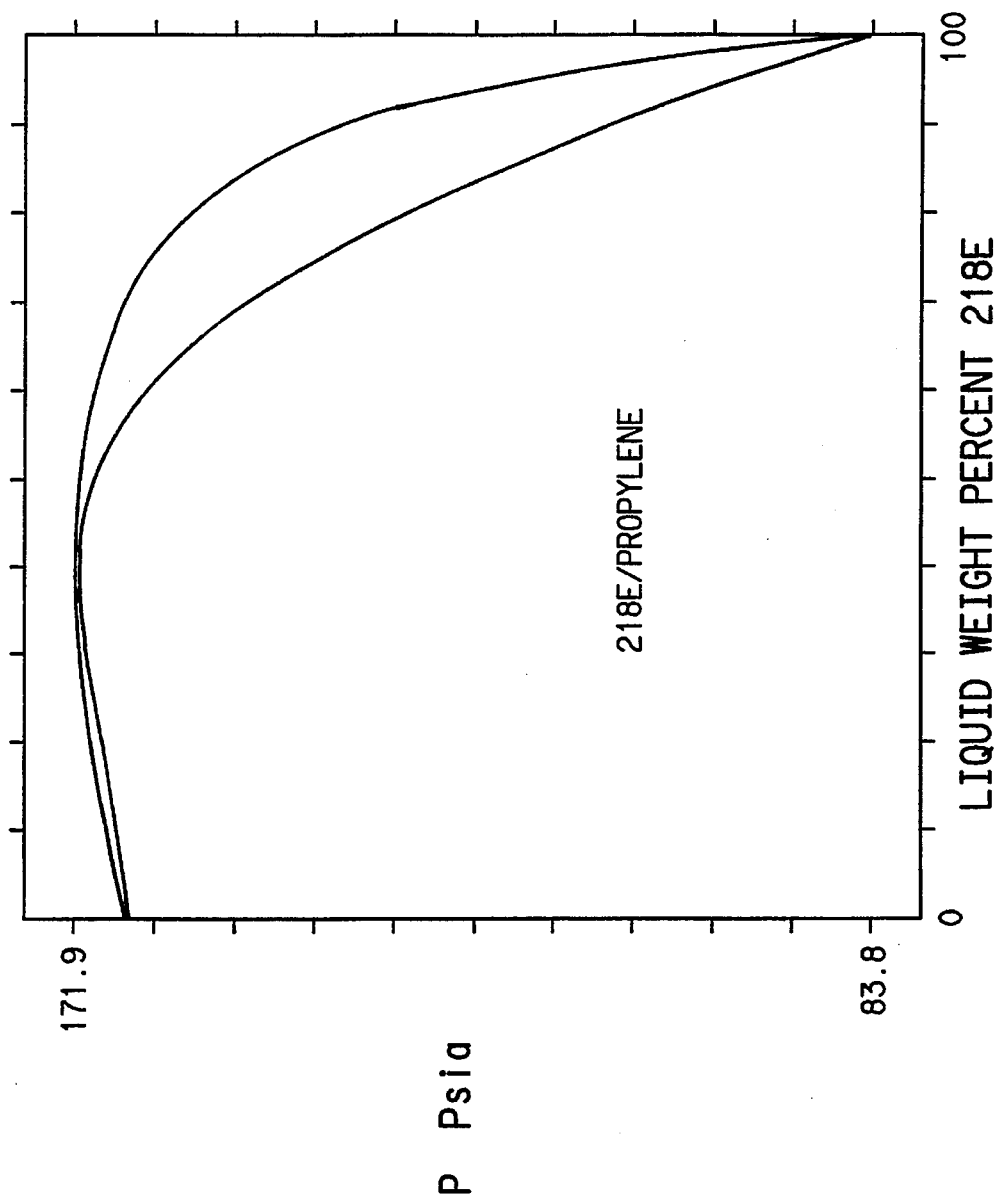
FIG. 17 is a graph of the vapor/liquid equilibrium curve for mixtures of 218E and propylene at 25° C.
Figure 18:
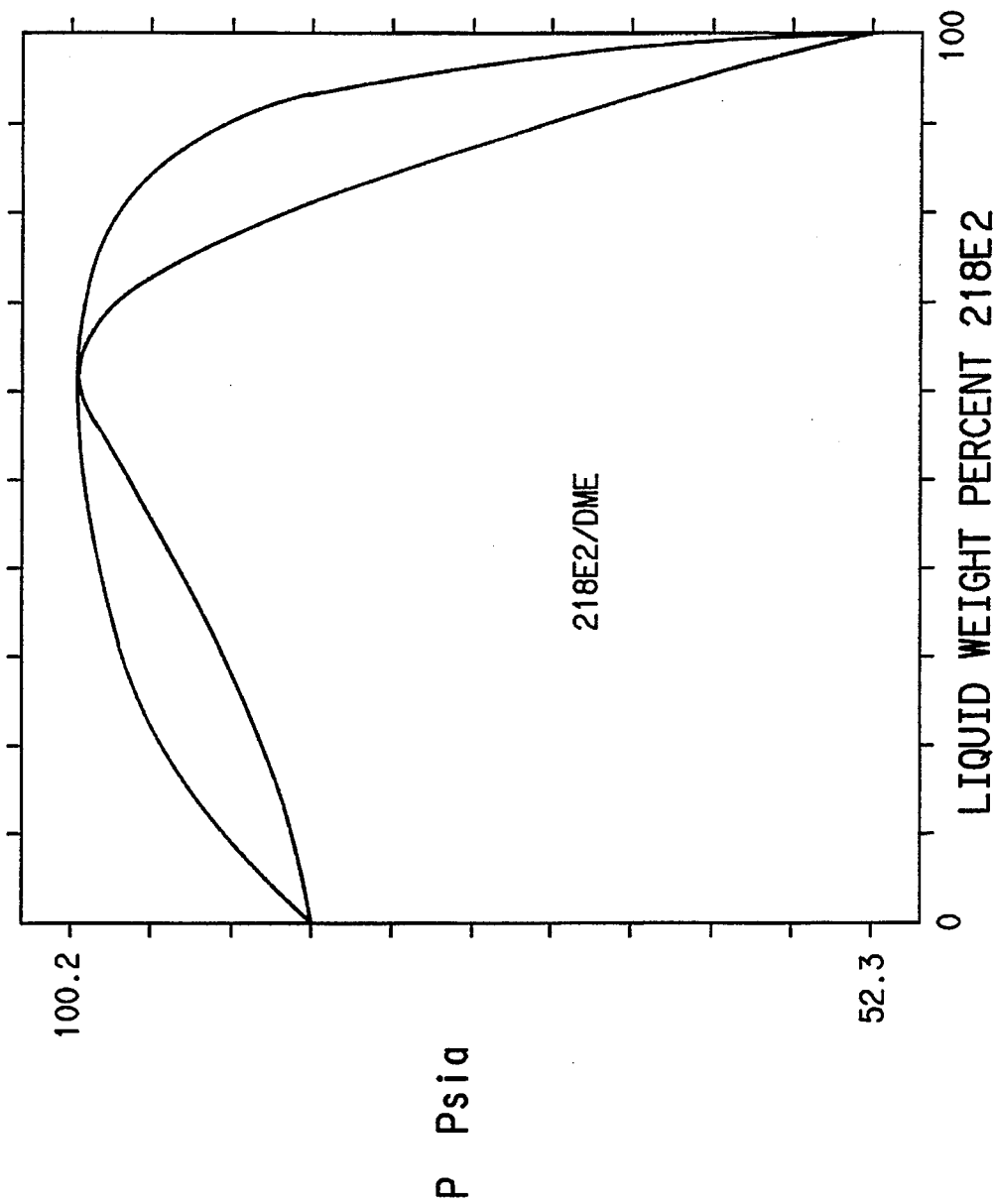
FIG. 18 is a graph of the vapor/liquid equilibrium curve for mixtures of 218E2 and DME at 25° C.
Figure 19:
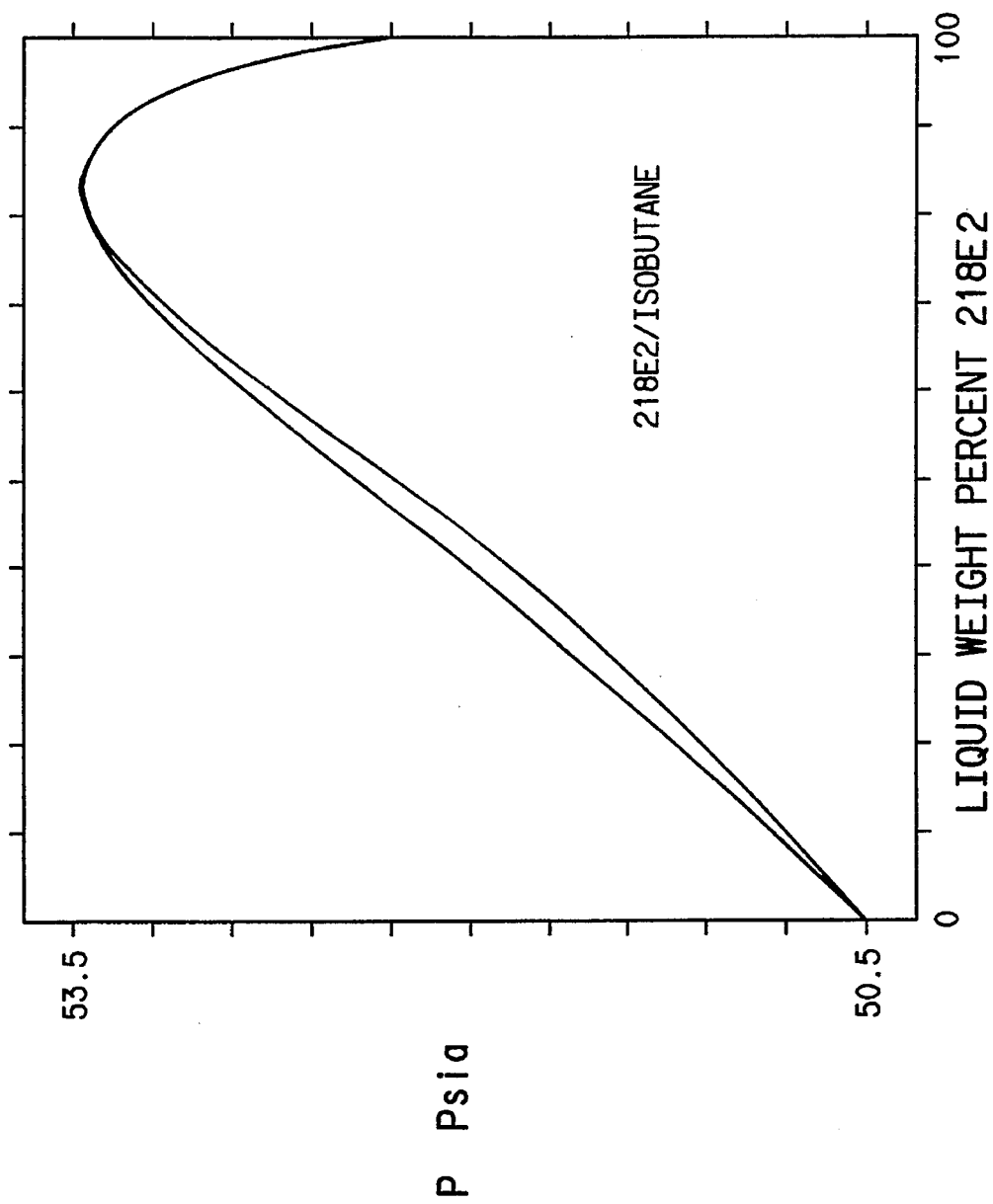
FIG. 19 is a graph of the vapor/liquid equilibrium curve for mixtures of 218E2 and isobutane at 25° C.
Figure 20:
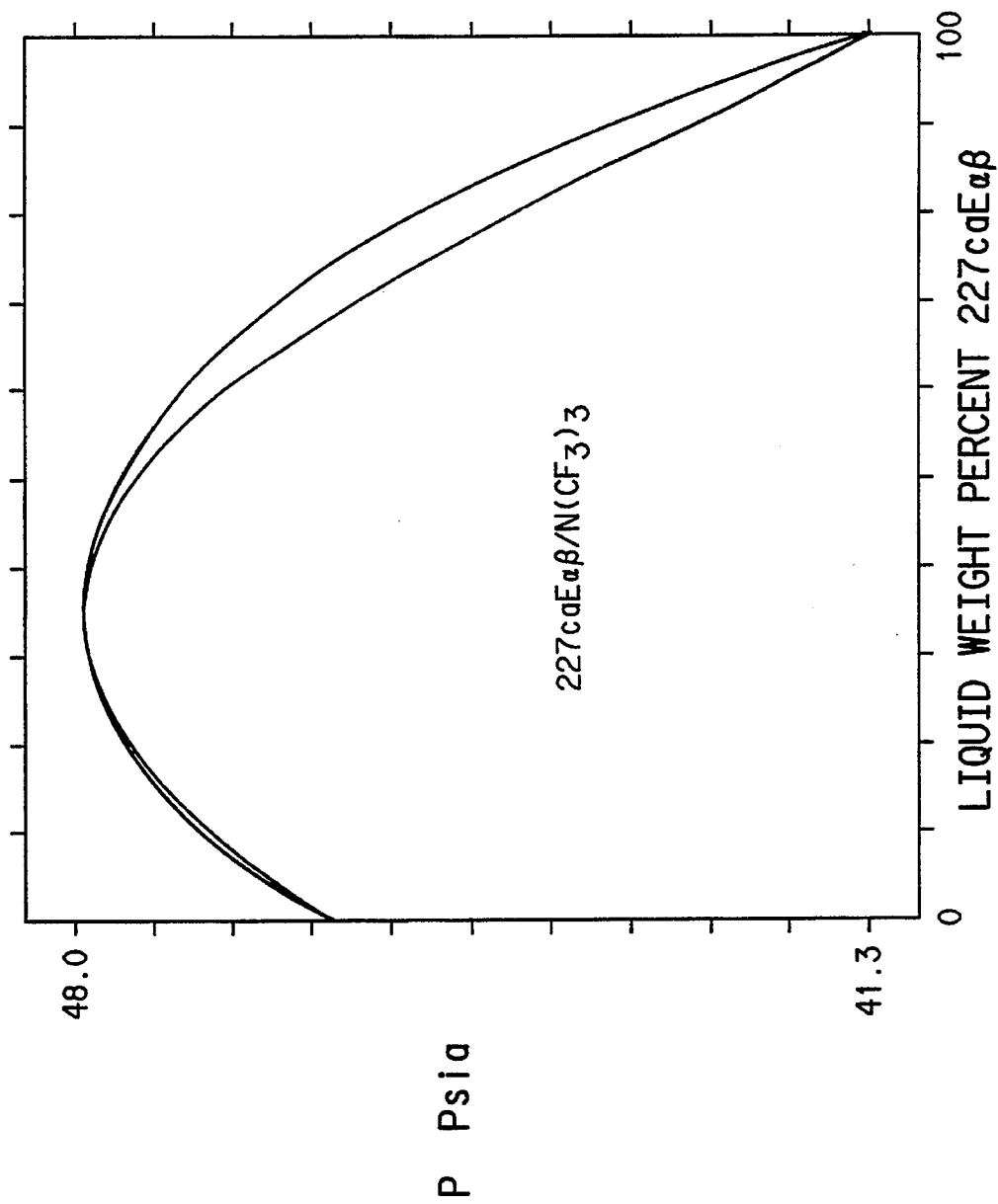
FIG. 20 is a graph of the vapor/liquid equilibrium curve for mixtures of 227caEαβ and $N(CF_3)_3$ at 25° C.
Figure 21:
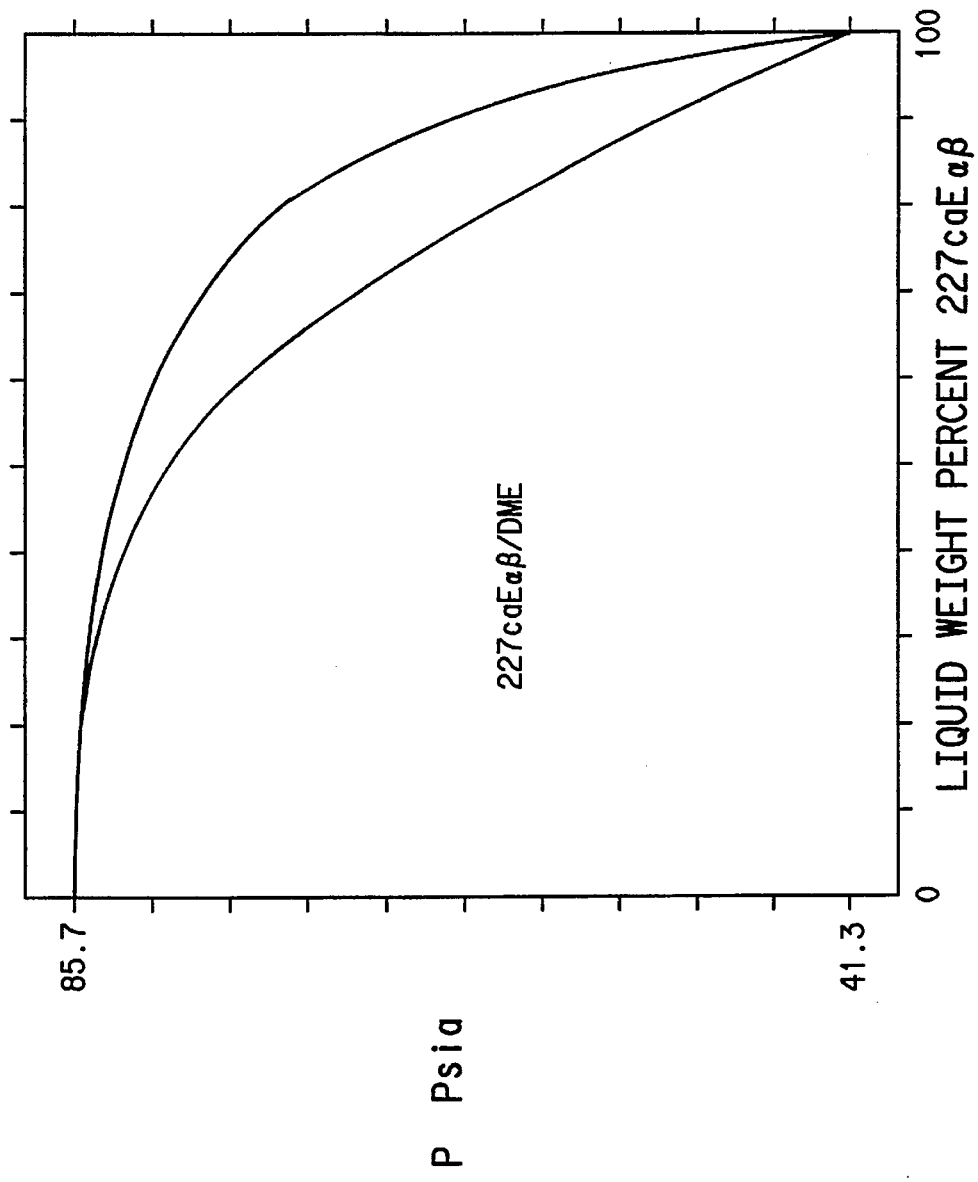
FIG. 21 is a graph of the vapor/liquid equilibrium curve for mixtures of 227caEαβ and DME at 25° C.
Figure 22:
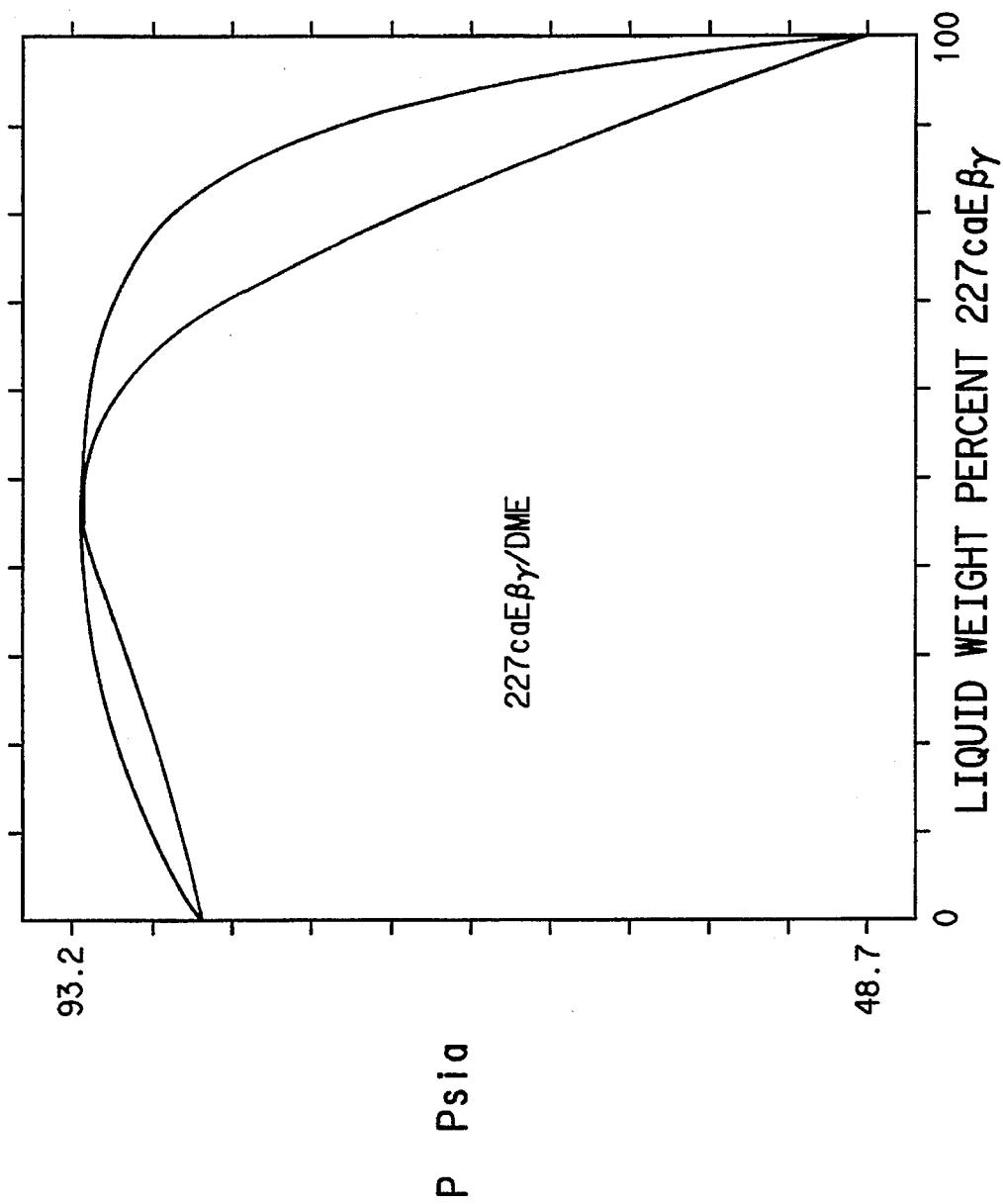
FIG. 22 is a graph of the vapor/liquid equilibrium curve for mixtures of 227caEβγ and DME at 25° C.
Figure 23:
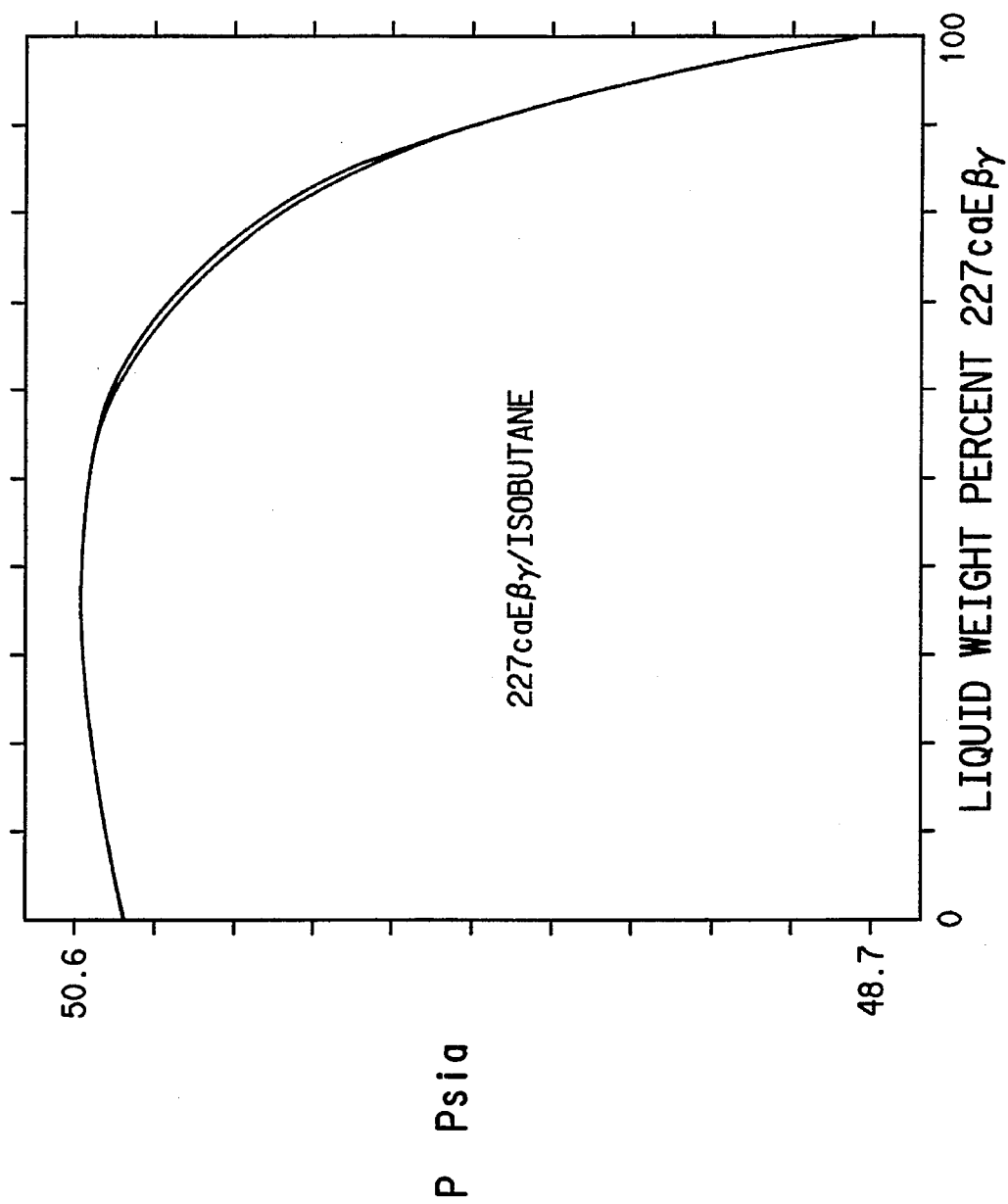
FIG. 23 is a graph of the vapor/liquid equilibrium curve for mixtures of 227caEβγ and isobutane at 25° C.
Figure 24:
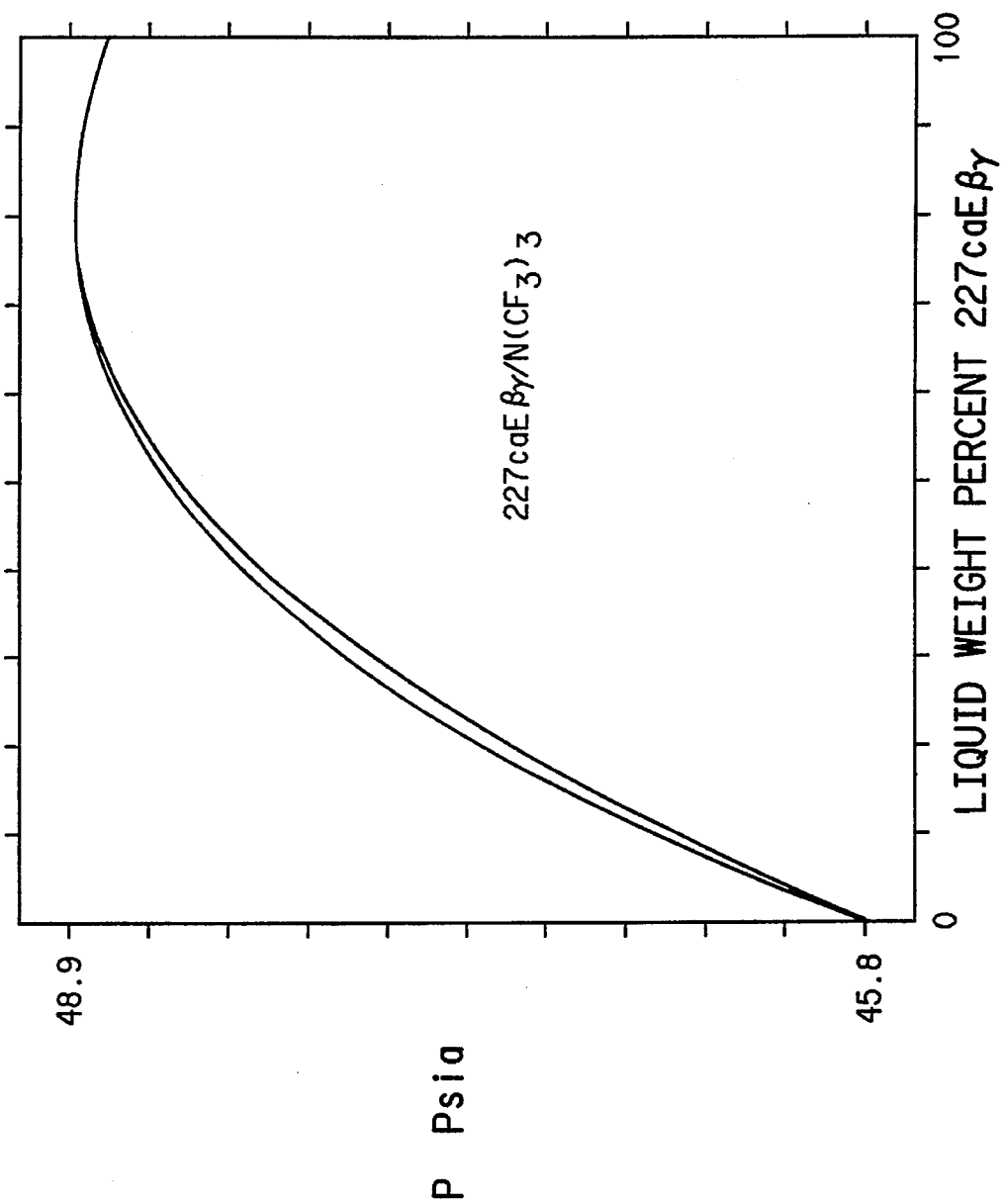
FIG. 24 is a graph of the vapor/liquid equilibrium curve for mixtures of 227caEβγ and $N(CF_3)_3$ at 25° C.
Figure 25:
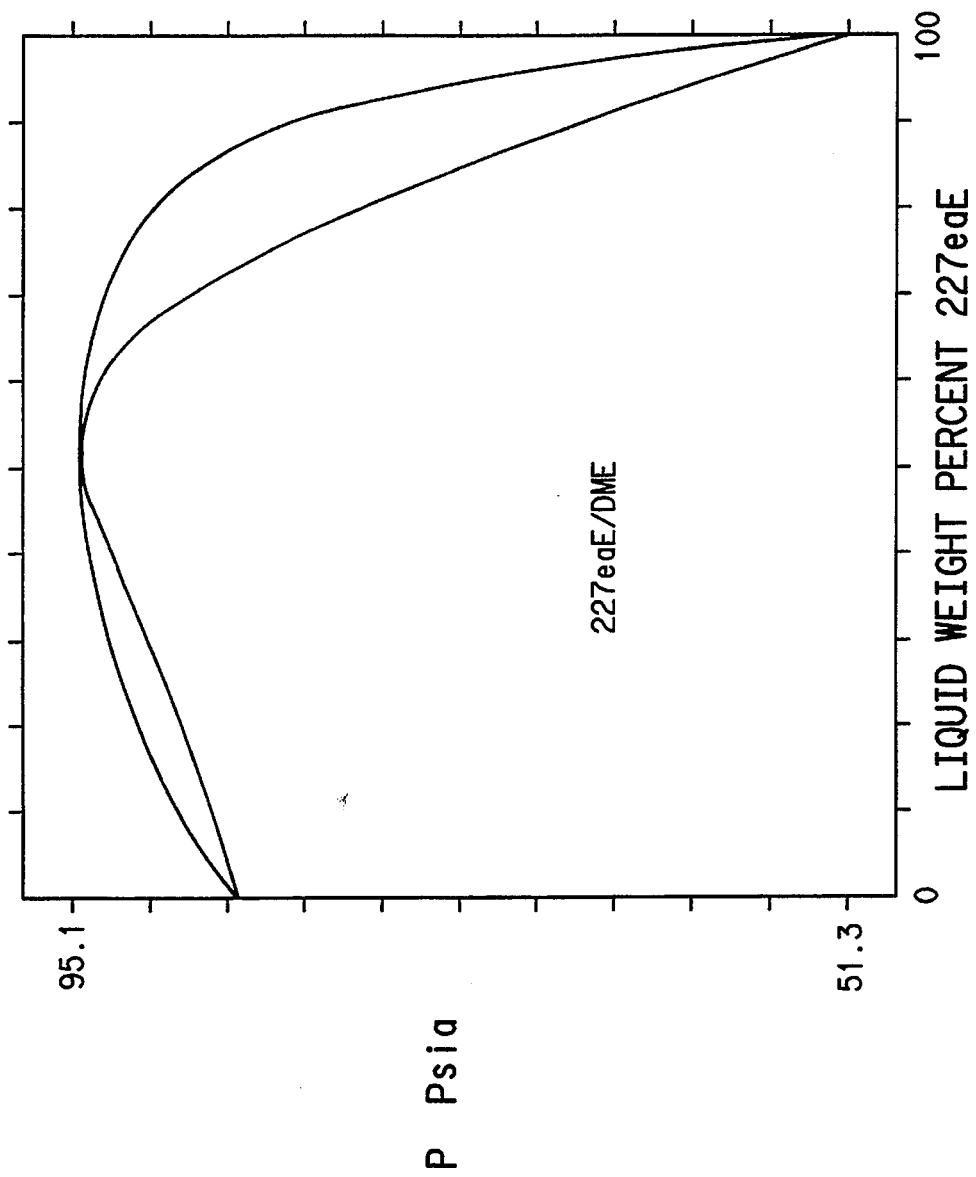
FIG. 25 is a graph of the vapor/liquid equilibrium curve for mixtures of 227eaE and DME at 25° C.
Figure 26:
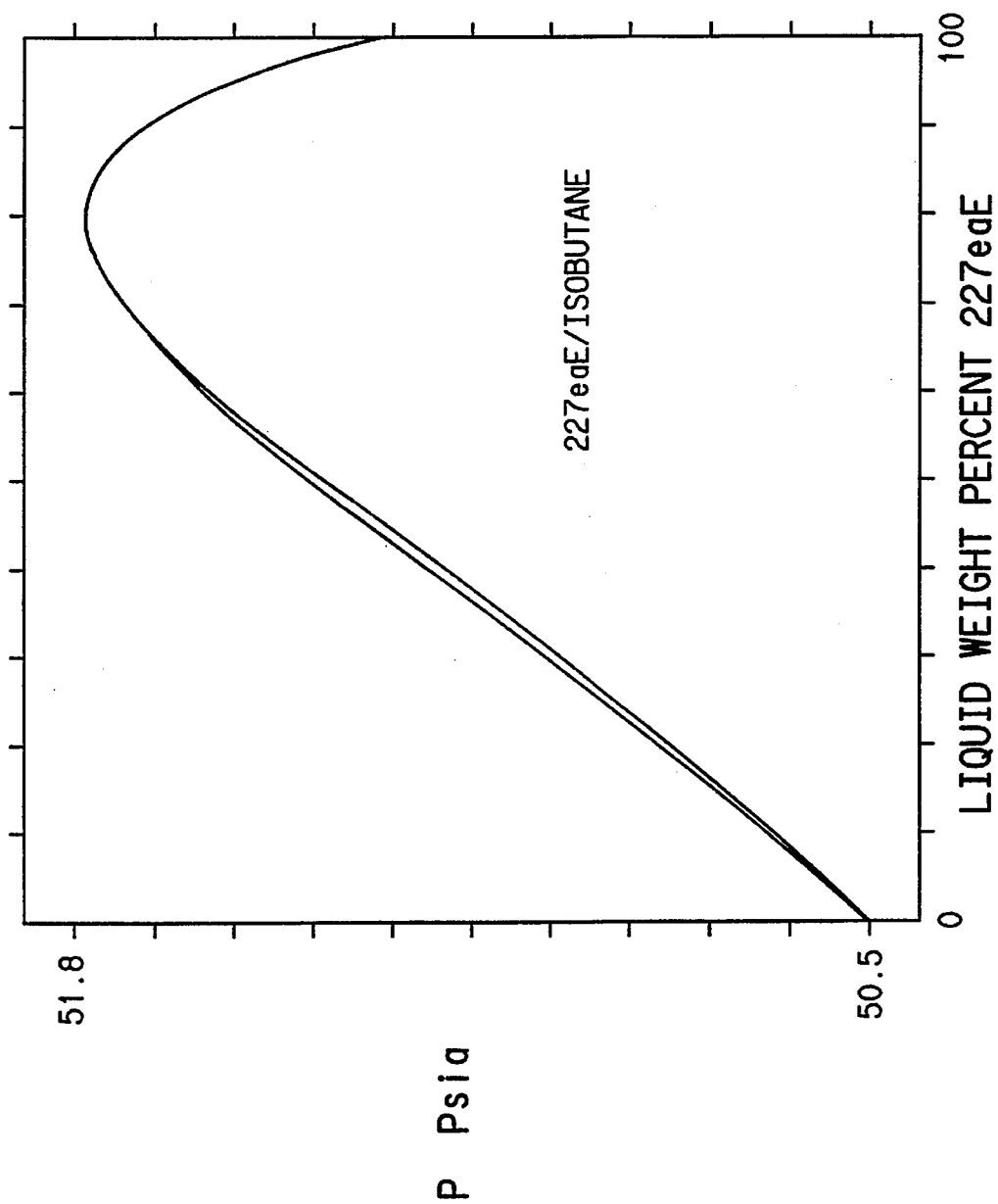
FIG. 26 is a graph of the vapor/liquid equilibrium curve for mixtures of 227eaE and isobutane at 25° C.
Figure 27:
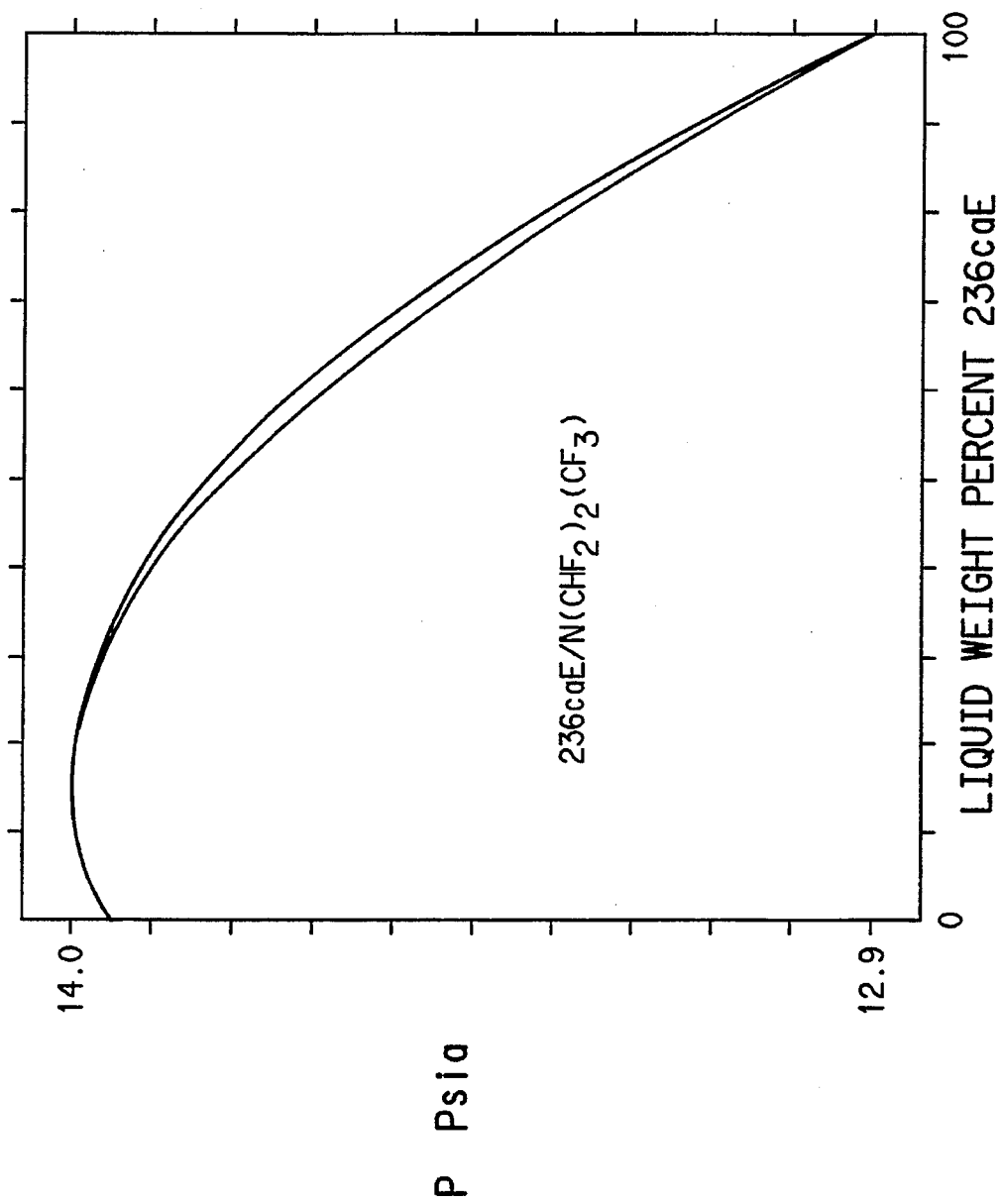
FIG. 27 is a graph of the vapor/liquid equilibrium curve for mixtures of 236CaE and $N(CHF_2)_2(CF_3)$ at 25° C.

The present invention relates to the following compositions: hexafluorodimethyl ether and cyclopropane, dimethyl ether or propylene; bis(difluoromethyl) ether and 2,2,3,4,4-pentafluorooxetane; fluoromethyl trifluoromethyl ether and 2,2,4,4,5,5-hexafluoro-1,3-dioxolane, 1-trifluoromethoxy-1,2,2,2-tetrafluoroethane, dimethyl ether or tris(trifluoromethyl)amine; trifluoromethyl methyl ether and perfluorooxetane, 2,2,4,4,5,5-hexafluoro-1,3-dioxolane, perfluoromethyl ethyl ether, perfluorodimethoxymethane, 1-trifluoromethoxy-1,2,2,2-tetrafluoroethane, dimethyl ether or tris(trifluoromethyl)amine; perfluoromethyl ethyl ether and dimethyl ether or propylene; perfluorodimethoxymethane and dimethyl ether or isobutane; 1-trifluoromethoxy-1,1,2,2-tetrafluoroethane and tris(trifluoromethyl)amine or dimethyl ether; difluoromethoxy pentafluoroethane and dimethyl ether, isobutane or tris(trifluoromethyl)amine; 1-trifluoromethoxy-1,2,2,2-tetrafluoroethane and dimethyl ether or isobutane; 1-difluoromethoxy-1,1,2,2-tetrafluoroethane and $N(CHF_2)_2(CF_3)$; or 1,1,1,2,2,3,3-heptafluoro-3-(1,2,2,2-tetrafluoroethoxy)propane and 1,1,2,2,3-pentafluoropropane or 1,1,1,2,3-pentafluoropropane. This invention also relates to the discovery of effective amounts of the components of these compositions to form azeotropic or azeotrope-like compositions.

1–99 wt. % of each of the above components can be used as refrigerants.

The components of the refrigerants in this invention include the following.

1. Hexafluorodimethyl ether (116E, or $CF_3OCF_3$, boiling point=−59.0° C.),
2. bis(difluoromethyl) ether (134E, or $CHF_2OCHF_2$, boiling point =5° C.),
3. Fluoromethyl trifluoromethyl ether (134aE, or $CH_2FOCF_3$, boiling point=−20.0° C.),
4. Trifluoromethyl methyl ether (143aE, or $CH_3OCF_3$, boiling point=−24.2° C.),
5. Perfluorooxetane (C-216E or

boiling point=−29.2° C.),
6. 2,2,4,4,5,5-hexafluoro-1,3-dioxolane (C-216E2 or $C_3F_6O_2$, having a structure of

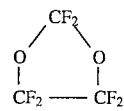

boiling point=−22.1° C.),
7. Perfluoromethyl ethyl ether (218E, or $CF_3OCF_2CF_3$, boiling point=−23.3° C.),
8. Perfluorodimethoxymethane (218E2, or $CF_3OCF_2OCF_3$, boiling point=−10.2° C.),
9. 1-trifluoromethoxy-1,1,2,2-tetrafluoroethane (227caEαβ, or $CF_3OCF_2CHF_2$, boiling point=about −3° C.),
10. Difluoromethoxy pentafluoroethane (227caEβγ, or $CHF_2OCF_2CF_3$, boiling point=−8.0° C.),
11. 1-trifluoromethoxy-1,2,2,2-tetrafluoroethane (227eaE, or $CF_3OCHFCF_3$, boiling point=−9.4° C.),
12. 1,1,1,2,2,3,3-heptafluoro-3-(1,2,2,2-tetrafluoroethoxy)propane (E42-11meEγδ, or $CF_3CF_2CF_2OCHFCF_3$, boiling point=40.8° C.),
13. dimethyl ether (DME, or $CH_3OCH_3$)
14. 2,2,3,4,4-pentafluorooxetane (C-225eEαβ, or $C_3HF_5O$, having a structure of

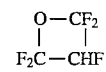

boiling point=3.4° C.)
15. tris(trifluoromethyl)amine, $(CF_3)_3N$, boiling point=−6.5° C.),
16. 1-difluoromethoxy-1,1,2,2-tetrafluoroethane (236caE, or $CHF_2OCF_2CHF_2$, boiling point=28.5° C.),
17. 1,1,2,2,3-pentafluoropropane (HFC-245ca, or $CHF_2CF_2CH_2F$, boiling point=25.13° C.), and
18. 1,1,1,2,3-pentafluoropropane (HFC-245eb, or $CF_3CHFCH_2F$, boiling point=22.46° C.).

116E (CAS Reg. No. 1479-49-8) has been prepared by electrochemical fluorination of dimethyl ether as disclosed by Simons in U.S. Pat. No. 2,519,983.

134aE (CAS Reg. No. 2261-01-0) has been made by the electrochemical fluorination of methyl 2-methoxypropionate as reported by Berenblit, et. al. Zh. Org. Khim., Vol. 12, pp. 767–770 (1976).

143aE (CAS Reg. No. 421-14-7) has been made by the reaction of methyl fluoroformate with sulfur tetrafluoride as reported by Aldrich and Sheppard, J. Am. Chem. Soc., Vol. 29, 11–15 (1964).

C-216E (CAS Reg. No. 425-82-1) can be made by electrochemical fluorination of trimethylene oxide (oxetane) in anhydrous hydrogen fluoride as disclosed by Kauck and Simons in U.S. Pat. No. 2,594,272.

C-216E2 (CAS Reg. No. 21297-65-4) has been prepared by UV irradiation of perfluoro-b-oxa-d-valerolactone in the vapor or liquid phase as reported by Throckmorton in *J. Org. Chem.*, Vol. 34, pp. 3438–3440 (1969). The lactone was prepared by the reaction of KF with perfluorooxydiacetyl chloride.

218E (CAS Reg. No. 665-16-7) has been made by direct fluorination of $CF_3OCH_2CF_3$ (prepared by reaction of $CF_3OF$ with vinylidene fluoride) as reported by Sekiya and Ueda in Chemistry Letters, pp. 609–612 (1990).

218E2 (CAS Reg. No. 53772-78-4) was made in the electrochemical fluorination of methyl 2-methoxypropionate as reported by Berenblit, et. at. Zh. Org. Khim., Vol. 12, pp. 767–770 (1976).

227caEαβ (CAS Reg. No. 2356-61-8) has been prepared by reacting difluoroacetyl fluoride with cesium fluoride and carbonyl fluoride followed by treatment with sulfur tetrafluoride as disclosed by Elsemann in U.S. Pat. No. 3,362,190.

227caEβγ (CAS Reg. No. 53997-64-1) has been made by electrochemical fluorination of $CHCl_2OCF_2CHClF$ as reported by Okazaki, et. al. J. Fluorine Chem., Vol. 4, pp. 387–397 (1974).

227eaE (CAS Reg. No. 2356-62-9) was prepared by reacting 2-trifluoromethoxy-tetrafluoropropionyl fluoride ($CF_3CF(OCF_3)COF$) with aqueous potassium hydroxide at 230° C. as disclosed by Eisemann in U.S. Pat. No. 3,362,190.

236caE (CAS Reg. No. 32778-11-3) has been prepared by fluorination of $CHCl_2OCF_2CHF_2$ (prepared in turn by chlorination of $CH_3OCF_2CHF_2$) using anhydrous hydrogen fluoride with antimony pentachloride catalyst as reported by Terrell, et. al. in J. Medicinal Chem., Vol. 15, pp. 604–606 (1972).

E42-11meEγδ (CAS Reg. No. 3330-15-2) has been prepared by heating $CF_3CF_2CF_2OCF(CF_3)CO_2\text{-Na}$ + in ethylene glycol as disclosed by Selman and Smith in French Patent No. 1,373,014 (Chemical Abstracts 62:13047 g).

C-225eEαβ (CAS Reg. No. 144109-03-5) may be prepared by direct fluorination of trimethylene oxide (cyclo—$CH_2CH_2CH_2O$—) using techniques described by Lagow and Margrave in *Process in Inorganic Chemistry*, Vol. 26, pp. 161–210 (1979) or by Adcock and Cherry in *Ind. Eng. Chem. Res.*, Vol. 26, pp. 208–215 (1987). The direct fluorination is carried out to the desired level of fluorine incorporation into the starting material, and products recovered by fractional distillation.

$(CF_3)_3N$ (CAS Reg. No. 432-03-1) has been made by electrochemical fluorination of trimethyl amine in anhydrous hydrogen fluoride as disclosed by Kauck and Simons in U.S. Pat. No. 2,616,927.

By "azeotropic" composition is meant a constant boiling liquid admixture of two or more substances that behaves as a single substance. One way to characterize an azeotropic composition is that the vapor produced by partial evaporation or distillation of the liquid has the same composition as the liquid from which it was evaporated or distilled, that is, the admixture distills/refluxes without compositional change. Constant boiling compositions are characterized as azeotropic because they exhibit either a maximum or minimum boiling point, as compared with that of the non-azeotropic mixtures of the same components.

By "azeotrope-like" composition is meant a constant boiling, or substantially constant boiling, liquid admixture of two or more substances that behaves as a single substance. One way to characterize an azeotrope-like composition is that the vapor produced by partial evaporation or distillation of the liquid has substantially the same composition as the liquid from which it was evaporated or distilled, that is, the admixture distills/refluxes without substantial composition change. Another way to characterize an azeotrope-like composition is that the bubble point vapor pressure and the dew point vapor pressure of the composition at a particular temperature are substantially the same.

It is recognized in the art that a composition is azeotrope-like if, after 50 weight percent of the composition is removed such as by evaporation or boiling off, the difference in vapor pressure between the original composition and the composition remaining after 50 weight percent of the original composition has been removed is less than 10 percent, when measured in absolute units. By absolute units, it is meant measurements of pressure and, for example, psia, atmospheres, bars, torr, dynes per square centimeter, millimeters of mercury, inches of water and other equivalent terms well known in the art. If an azeotrope is present, there is no difference in vapor pressure between the original composition and the composition remaining after 50 weight percent of the original composition has been removed.

Therefore, included in this invention are compositions of effective amounts of 116E and cyclopropane, DME or propylene; 134E and C-225eEαβ; 134aE and C-216E2, 227eaE, DME or $N(CF_3)_3$; 143aE and C-216E, C-216E2, 218E, 218E2, 227eaE, DME or $N(CF_3)_3$; 218E and DME or propylene; 218E2 and DME or isobutane; 227caEαβ and $N(CF_3)_3$ or DME; 227caEβγ and DME, isobutane or $N(CF_3)_3$; 227eaE and DME or isobutane; 236caE and $N(CHF_2)_2(CF_3)$; or E-42-11meEγδ and HFC-245ca or HFC-245eb, such that after 50 weight percent of an original composition is evaporated or boiled off to produce a remaining composition, the difference in the vapor pressure between the original composition and the remaining composition is 10 percent or less.

For compositions that are azeotropic, there is usually some range of compositions around the azeotrope point that, for a maximum boiling azeotrope, have boiling points at a particular pressure higher than the pure components of the composition at that pressure and have vapor pressures at a particular temperature lower than the pure components of the composition at that temperature, and that, for a minimum boiling azeotrope, have boiling points at a particular pressure lower than the pure components of the composition at that pressure and have vapor pressures at a particular temperature higher than the pure components of the composition at that temperature. Boiling temperatures and vapor pressures above or below that of the pure components are caused by unexpected intermolecular forces between and among the molecules of the compositions, which can be a combination of repulsive and attractive forces such as van der Waals forces and hydrogen bonding.

The range of compositions that have a maximum or minimum boiling point at a particular pressure, or a maximum or minimum vapor pressure at a particular temperature, may or may not be coextensive with the range of compositions that have a change in vapor pressure of less than about 10% when 50 weight percent of the composition is evaporated. In those cases where the range of compositions that have maximum or minimum boiling temperatures at a particular pressure, or maximum or minimum vapor pressures at a particular temperature, are broader than the range of compositions that have a change in vapor pressure of less than about 10% when 50 weight percent of the composition is evaporated, the unexpected intermolecular forces are nonetheless believed important in that the refrigerant compositions having those forces that are not substantially constant boiling may exhibit unexpected increases in the capacity or efficiency versus the components of the refrigerant composition.

The components of the compositions of this invention have the following vapor pressures at 25° C.

| Components | Psia | kPa |
|---|---|---|
| 116E | 292.2 | 2015 |
| 134E | 30.4 | 210 |
| 134aE | 73.8 | 509 |
| 143aE | 83.8 | 578 |
| 218E | 83.8 | 578 |
| 218E2 | 52.3 | 361 |
| 227caEαβ | 41.3 | 285 |
| 227caEβγ | 48.7 | 336 |
| 227eaE | 51.3 | 354 |
| 236caE | 12.9 | 89 |
| E-42-11meEγδ | 8.1 | 56 |
| Cyclopropane | 105.0 | 724 |
| DME | 85.7 | 591 |
| Propylene | 165.9 | 1144 |
| C-225eEαβ | 31.1 | 214 |
| C-216E2 | 76.7 | 529 |
| N(CF$_3$)$_3$ | 45.8 | 316 |
| C-216E | 100.3 | 692 |
| isobutane | 50.5 | 348 |
| N(CHF$_2$)$_2$(CF$_3$) | 13.9 | 96 |
| HFC-245ca | 14.2 | 98 |
| HFC-245cb | 16.9 | 117 |

Substantially constant boiling, azeotropic or azeotrope-like compositions of this invention comprise the following (all compositions are measured at 25° C.):

| COMPONENTS | WEIGHT RANGES (wt. %/wt/%) | PREFERRED (wt. %/wt/%) |
|---|---|---|
| 116E/cyclopropane | 72–99/1–28 | 72–99/1–28 |
| 116E/DME | 68–99/1–32 | 68–99/1–32 |
| 116E/propylene | 60–99/1–40 | 60–99/1–40 |
| 134E/C-225eEαβ | 1–99/1–99 | 1–80/20–99 |
| 134aE/C-216E2 | 1–99/1–99 | 20–99/1–80 |
| 134aE/227eaE | 1–99/1–99 | 20–99/1–80 |
| 134aE/DME | 1–99/1–99 | 20–99/1–80 |
| 134aE/N(CF$_3$)$_3$ | 20–99/1–80 | 40–99/1–60 |
| 143aE/C-216E | 1–99/1–99 | 1–80/20–99 |
| 143aE/C-216E2 | 1–99/1–99 | 1–80/20–99 |
| 143aE/218E | 1–99/1–99 | 1–80/20–99 |
| 143aE/218E2 | 1–99/1–99 | 1–99/1–99 |
| 143aE/227eaE | 1–99/1–99 | 1–99/1–99 |
| 143aE/DME | 1–99/1–99 | 10–90/10–90 |
| 143aE/N(CF$_3$)$_3$ | 27–99/1–73 | 27–99/1–73 |
| 218E/DME | 50–92/8–50 | 50–92/8–50 |
| 218E/propylene | 1–82/18–99 | 20–82/18–80 |
| 218E2/DME | 1–86/14–99 | 30–86/14–70 |
| 218E2/isobutane | 1–99/1–99 | 20–99/1–80 |
| 227caEαβ/N(CF$_3$)$_3$ | 1–99/1–99 | 1–80/20–99 |
| 227caEαβ/DME | 1–80/20–99 | 10–80/20–90 |
| 227caEβγ/DME | 1–83/17–99 | 20–83/17–80 |

-continued

| COMPONENTS | WEIGHT RANGES (wt. %/wt/%) | PREFERRED (wt. %/wt/%) |
|---|---|---|
| 227caEβγ/isobutane | 1–99/1–99 | 20–99/1–80 |
| 227caEβγ/N(CF$_3$)$_3$ | 1–99/1–99 | 20–99/1–80 |
| 227eaE/DME | 1–84/16–99 | 20–84/16–80 |
| 227eaE/isobutane | 1–99/1–99 | 20–99/1–80 |
| 236caE/N(CHF$_2$)$_2$(CF$_3$) | 1–99/1–99 | 1–80/20–99 |
| E-42-11meEγδ/HFC-245ca | 1–72/18–99 | 1–50/50–99 |
| E-42-11meEγδ/HFC-245cb | 98–99/1–2 | — |
| E-42-11meEγδ/HFC-245cb | 1–70/30–99 | 1–50/50–99 |

For purposes of this invention, "effective amount" is defined as the amount of each component of the inventive compositions which, when combined, results in the formation of an azeotropic or azeotrope-like composition. This definition includes the amounts of each component, which amounts may vary depending on the pressure applied to the composition so long as the azeotropic or azeotrope-like compositions continue to exist at the different pressures, but with possible different boiling points.

Therefore, effective mount includes the mounts, such as may be expressed in weight percentages, of each component of the compositions of the instant invention which form azeotropic or azeotrope-like compositions at temperatures or pressures other than as described herein.

For the purposes of this discussion, azeotropic or constant-boiling is intended to mean also essentially azeotropic or essentially-constant boiling. In other words, included within the meaning of these terms are not only the true azeotropes described above, but also other compositions containing the same components in different proportions, which are true azeotropes at other temperatures and pressures, as well as those equivalent compositions which are part of the same azeotropic system and are azeotrope-like in their properties. As is well recognized in this art, there is a range of compositions which contain the same components as the azeotrope, which will not only exhibit essentially equivalent properties for refrigeration and other applications, but which will also exhibit essentially equivalent properties to the true azeotropic composition in terms of constant boiling characteristics or tendency not to segregate or fractionate on boiling.

It is possible to characterize, in effect, a constant boiling admixture which may appear under many guises, depending upon the conditions chosen, by any of several criteria:

The composition can be defined as an azeotrope of A, B, C (and D . . . ) since the very term "azeotrope" is at once both definitive and limitative, and requires that effective amounts of A, B, C (and D . . . ) for this unique composition of matter which is a constant boiling composition.

It is well known by those skilled in the art, that, at different pressures, the composition of a given azeotrope will vary at least to some degree, and changes in pressure will also change, at least to some degree, the boiling point temperature. Thus, an azeotrope of A, B, C (and D . . . ) represents a unique type of relationship but with a variable composition which depends on temperature and/or pressure. Therefore, compositional ranges, rather than fixed compositions, are often used to define azeotropes.

The composition can be defined as a particular weight percent relationship or mole percent relationship of A, B, C (and D . . . ), while recognizing that such specific values point out only one particular relationship and that in actuality, a series of such relationships, represented by A, B, C (and D . . . ) actually exist for a given azeotrope, varied by the influence of pressure.

An azeotrope of A, B, C (and D . . . ) can be characterized by defining the compositions as an azeotrope characterized by a boiling point at a given pressure, thus giving identifying characteristics without unduly limiting the scope of the invention by a specific numerical composition, which is limited by and is only as accurate as the analytical equipment available.

The azeotrope or azeotrope-like compositions of the present invention can be prepared by any convenient method including mixing or combining the desired amounts. A preferred method is to weigh the desired component amounts and thereafter combine them in an appropriate container.

Specific examples illustrating the invention are given below. Unless otherwise stated therein, all percentages are by weight. It is to be understood that these examples are merely illustrative and in no way are to be interpreted as limiting the scope of the invention.

EXAMPLE 1

Phase Study

A phase study shows the following compositions are azeotropic, all at 25° C. except 227caEαβ/dimethyl ether and the E-42-11meψδ/HFC-245eb which are azeotropic-like 25° C.

| Composition No. | Weight percent of the components | Vapor Press. psia (kPa) | |
|---|---|---|---|
| 116E/cyclopropane | 96.9/3.1 | 295.1 | 2035 |
| 116E/DME | 93.9/6.1 | 308.6 | 2128 |
| 116E/propylene | 89.3/10.7 | 312.7 | 2156 |
| 134E/C-225eEαβ | 35.6/64.4 | 31.8 | 219 |
| 134aE/C-216E2 | 27.8/72.2 | 77.9 | 537 |
| 134aE/227eaE | 94.0/6.0 | 73.9 | 510 |
| 134aE/DME | 36.7/63.3 | 86.7 | 598 |
| 134aE/N(CF$_3$)$_3$ | 71.8/28.2 | 76.9 | 530 |
| 143aE/C-216E | 3.8/96.2 | 100.4 | 692 |
| 143aE/C-216E2 | 60.3/39.7 | 85.4 | 589 |
| 143aE/218E | 39.3/60.7 | 105.6 | 728 |
| 143aE/218E2 | 73.8/26.2 | 85.7 | 591 |
| 143aE/227caE | 92.9/7.1 | 83.9 | 578 |
| 143aE/DME | 51.4/48.6 | 92.6 | 638 |
| 143aE/N(CF$_3$)$_3$ | 71.0/29.0 | 87.6 | 604 |
| 218E/DME | 75.5/24.5 | 126.6 | 873 |
| 218E/propylene | 40.1/59.9 | 171.9 | 1185 |
| 218E2/DME | 60.9/39.1 | 100.2 | 691 |
| 218E2/isobutane | 83.6/16.4 | 53.5 | 369 |
| 227caEαβ/N(CF$_3$)$_3$ | 35.1/64.9 | 48.0 | 331 |
| 227caEαβ/DME | 4.7/95.3 | 85.7 | 591 |
| 227caEβγ/DME | 49.5/50.5 | 93.2 | 643 |
| 227caEβγ/isobutane | 39.1/60.9 | 50.6 | 349 |
| 227caEβγ/N(CF$_3$)$_3$ | 80.0/20.0 | 48.9 | 337 |
| 227eaE/DME | 52.9/47.1 | 95.1 | 656 |
| 227eaE/isobutane | 80.9/19.1 | 51.8 | 357 |
| 236caE/N(CHF$_2$)$_2$(CF$_3$) | 16.2/83.8 | 14.0 | 97 |
| E-42-11meEγδ/HFC-245ca | 26.0/74.0 | 15.2 | 105 |
| E-42-11meEγδ/HFC-245eb | 15.7/84.3 | 16.4 | 113 |

EXAMPLE 2

Impact of Vapor Leakage on Vapor Pressure at 25° C.

A vessel is charged with an initial composition at 25° C., and the vapor pressure of the composition is measured. The composition is allowed to leak from the vessel, while the temperature is held constant at 25° C., until 50 weight percent of the initial composition is removed, at which time the vapor pressure of the composition remaining in the vessel is measured. The results are summarized below.

| | INITIAL | | 50% LEAK | | DELTA |
|---|---|---|---|---|---|
| WT % A/WT % B | PSIA | KPA | PSIA | KPA | % P |
| 116E/cyclopropane | | | | | |
| 96.9/3.1 | 295.1 | 2035 | 295.1 | 2035 | 0.0 |
| 99/1 | 293.9 | 2026 | 293.8 | 2026 | 0.0 |
| 60/40 | 255.9 | 1764 | 133.6 | 921 | 47.8 |
| 80/20 | 276.4 | 1906 | 262.7 | 1811 | 5. |
| 75/25 | 270.6 | 1866 | 250.4 | 1726 | 7.5 |
| 72/28 | 267.4 | 1844 | 241.7 | 1666 | 9.6 |
| 71/29 | 266.4 | 1837 | 238.2 | 1642 | 10.6 |
| 116E/DME | | | | | |
| 93.9/6.1 | 308.6 | 2128 | 308.6 | 2128 | 0.0 |
| 99/1 | 299.0 | 2062 | 296.8 | 2046 | 0.7 |
| 70/30 | 292.7 | 2018 | 275.8 | 1902 | 5.8 |
| 68/32 | 291.6 | 2011 | 267.6 | 1845 | 8.2 |
| 67/33 | 291.1 | 2007 | 257.7 | 1777 | 11.5 |
| 116E/propylene | | | | | |
| 89.3/10.7 | 312.7 | 2156 | 312.7 | 2156 | 0.0 |
| 99/1 | 297.2 | 2049 | 295.9 | 2040 | 0.4 |
| 60/40 | 292.1 | 2014 | 263.3 | 1815 | 9.9 |
| 59/41 | 291.2 | 2008 | 259.5 | 1789 | 10.9 |
| 134E/C-225eEαβ | | | | | |
| 35.6/64.4 | 31.8 | 219 | 31.8 | 219 | 0.0 |
| 20/80 | 31.6 | 218 | 31.6 | 218 | 0.0 |
| 1/99 | 31.1 | 214 | 31.1 | 214 | 0.0 |
| 80/20 | 31.1 | 214 | 31.1 | 214 | 0.0 |
| 99/1 | 30.5 | 210 | 30.5 | 210 | 0.0 |
| 134aE/C-216E2 | | | | | |
| 27.8/72.2 | 77.9 | 537 | 77.9 | 537 | 0.0 |
| 15/85 | 77.7 | 536 | 77.7 | 536 | 0.0 |
| 1/99 | 76.8 | 530 | 76.8 | 530 | 0.0 |
| 60/40 | 76.9 | 530 | 76.8 | 530 | 0.1 |
| 80/20 | 75.6 | 521 | 75.5 | 521 | 0.1 |
| 99/1 | 73.9 | 510 | 73.9 | 510 | 0.0 |
| 134aE/227eaE | | | | | |
| 94.0/6.0 | 73.9 | 510 | 73.9 | 510 | 0.0 |
| 99/1 | 73.8 | 509 | 73.8 | 509 | 0.0 |
| 60/40 | 71.9 | 496 | 71.3 | 492 | 0.8 |
| 40/60 | 68.4 | 472 | 66.8 | 461 | 2.3 |
| 20/80 | 62.3 | 430 | 59.6 | 411 | 4.3 |
| 10/90 | 57.6 | 397 | 55.4 | 382 | 3.8 |
| 1/99 | 52. | 359 | 51.7 | 356 | 0.6 |
| 134aE/DME | | | | | |
| 36.7/63.3 | 86.7 | 598 | 86.7 | 598 | 0.0 |
| 20/80 | 86.5 | 596 | 86.5 | 596 | 0.0 |
| 1/99 | 85.8 | 592 | 85.8 | 592 | 0.0 |
| 60/40 | 86.0 | 593 | 85.8 | 592 | 0.2 |
| 80/20 | 83.0 | 572 | 82.4 | 568 | 0.7 |
| 99/1 | 74.6 | 514 | 74.4 | 513 | 0.3 |
| 134aE/N(CF$_3$)$_3$ | | | | | |
| 71.8/28.2 | 76.9 | 530 | 76.9 | 530 | 0.0 |
| 85/15 | 76.3 | 526 | 76.1 | 525 | 0.3 |
| 99/1 | 74.1 | 511 | 74. | 510 | 0.1 |
| 40/60 | 73.6 | 507 | 71.2 | 491 | 3.3 |
| 20/80 | 65.9 | 454 | 59.3 | 409 | 10. |
| 19/81 | 65.3 | 450 | 58.6 | 404 | 10.3 |
| 143aE/C-216E | | | | | |
| 3.8/96.2 | 100.4 | 692 | 100.4 | 692 | 0.0 |
| 1/99 | 100.4 | 692 | 100.4 | 692 | 0.0 |
| 20/80 | 99.5 | 686 | 99.4 | 685 | 0.1 |
| 40/60 | 96.9 | 668 | 96.4 | 665 | 0.5 |
| 60/40 | 93.3 | 643 | 92.3 | 636 | 1.1 |
| 80/20 | 88.9 | 613 | 87.9 | 606 | 1.1 |
| 90/10 | 86.4 | 596 | 85.8 | 592 | 0.7 |
| 99/1 | 84.1 | 580 | 84. | 579 | 0.1 |
| 143aE/C-216E2 | | | | | |
| 60.3/39.7 | 85.4 | 589 | 85.4 | 589 | 0.0 |

|  | INITIAL | | 50% LEAK | | DELTA |
|---|---|---|---|---|---|
| WT % A/WT % B | PSIA | KPA | PSIA | KPA | % P |
| 80/20 | 85. | 586 | 84.9 | 585 | 0.1 |
| 99/1 | 83.9 | 578 | 83.9 | 578 | 0.0 |
| 30/70 | 83.9 | 578 | 83.7 | 577 | 0.2 |
| 1/99 | 77.1 | 532 | 77.1 | 532 | 0.0 |
| 143aE/218E | | | | | |
| 39.3/60.7 | 105.6 | 728 | 105.6 | 728 | 0.0 |
| 20/80 | 102.6 | 707 | 100.7 | 694 | 1.9 |
| 10/90 | 96.7 | 667 | 93.1 | 642 | 3.7 |
| 1/99 | 85.6 | 590 | 84.7 | 584 | 1.1 |
| 60/40 | 103.6 | 714 | 101.7 | 701 | 1.8 |
| 70/30 | 101.4 | 699 | 97. | 669 | 4.3 |
| 80/20 | 97.9 | 675 | 91.3 | 629 | 6.7 |
| 90/10 | 92.5 | 638 | 86.5 | 596 | 6.5 |
| 99/1 | 84.9 | 585 | 84. | 579 | 1.1 |
| 143aE/218E2 | | | | | |
| 73.8/26.2 | 85.7 | 591 | 85.7 | 591 | 0.0 |
| 85/15 | 85.4 | 589 | 85.3 | 588 | 0.1 |
| 99/1 | 84. | 579 | 83.9 | 578 | 0.1 |
| 60/40 | 85.2 | 587 | 85. | 586 | 0.2 |
| 40/60 | 82.3 | 567 | 80.2 | 553 | 2.6 |
| 20/80 | 74.4 | 513 | 68.5 | 472 | 7.9 |
| 15/85 | 70.8 | 488 | 64.3 | 443 | 9.2 |
| 13/87 | 69.2 | 477 | 62.5 | 431 | 9.7 |
| 12/88 | 68.2 | 470 | 61.7 | 425 | 9.5 |
| 10/90 | 66.3 | 457 | 59.9 | 413 | 9.7 |
| 9/91 | 65.2 | 450 | 59.1 | 407 | 9.4 |
| 5/95 | 60.2 | 415 | 55.8 | 385 | 7.3 |
| 1/99 | 54.1 | 373 | 52.9 | 365 | 2.2 |
| 143aE/227eaE | | | | | |
| 92.9/7.1 | 83.9 | 578 | 83.9 | 578 | 0.0 |
| 99/1 | 83.9 | 578 | 83.9 | 578 | 0.0 |
| 60/40 | 81.6 | 563 | 80.7 | 556 | 1.1 |
| 40/60 | 77.3 | 533 | 74.4 | 513 | 3.8 |
| 20/80 | 68.8 | 474 | 63.6 | 439 | 7.6 |
| 15/85 | 65.5 | 452 | 60.4 | 416 | 7.8 |
| 10/90 | 61.6 | 425 | 57.1 | 394 | 7.3 |
| 1/99 | 52.5 | 362 | 51.8 | 357 | 1.3 |
| 143aE/DME | | | | | |
| 58.9/41.1 | 88.2 | 608 | 88.2 | 608 | 0.0 |
| 80/20 | 87.5 | 603 | 87.4 | 603 | 0.1 |
| 99/1 | 84.1 | 580 | 84.1 | 580 | 0.0 |
| 40/60 | 87.9 | 606 | 87.8 | 605 | 0.1 |
| 20/80 | 86.9 | 599 | 86.9 | 599 | 0.0 |
| 1/99 | 85.8 | 592 | 85.8 | 592 | 0.0 |
| 143aE/N(CF$_3$)$_3$ | | | | | |
| 71.0/29.0 | 87.6 | 604 | 87.6 | 604 | 0.0 |
| 85/15 | 86.9 | 599 | 86.5 | 596 | 0.5 |
| 99/1 | 84.1 | 580 | 84. | 579 | 0.1 |
| 40/60 | 84.2 | 581 | 80.9 | 558 | 3.9 |
| 20/80 | 74.9 | 516 | 64.4 | 444 | 14. |
| 25/75 | 78.2 | 539 | 69.7 | 481 | 10.9 |
| 27/73 | 79.3 | 547 | 71.6 | 494 | 9.7 |
| 218E/DME | | | | | |
| 75.5/24.5 | 126.6 | 873 | 126.6 | 873 | 0.0 |
| 90/10 | 121.7 | 839 | 114.0 | 786 | 6.3 |
| 92/8 | 119.0 | 820 | 108.3 | 747 | 9.0 |
| 93/7 | 117.2 | 808 | 105.0 | 724 | 10.4 |
| 50/50 | 124.1 | 856 | 111.8 | 771 | 9.9 |
| 49/51 | 124.0 | 855 | 109.3 | 754 | 11.9 |
| 218E/propylene | | | | | |
| 40.1/59.9 | 171.9 | 1185 | 171.9 | 1185 | 0.0 |
| 20/80 | 170.4 | 1175 | 169.7 | 1170 | 0.4 |
| 1/99 | 166.2 | 1146 | 166.1 | 1145 | 0.1 |
| 60/40 | 169.9 | 1171 | 168.2 | 1160 | 1. |
| 80/20 | 158.8 | 1095 | 146.2 | 1008 | 7.9 |
| 85/15 | 151.7 | 1046 | 133.5 | 920 | 12. |
| 82/18 | 156.4 | 1078 | 141.6 | 976 | 9.5 |
| 218E2/DME | | | | | |
| 60.9/39.1 | 100.2 | 691 | 100.2 | 691 | 0.0 |
| 80/20 | 97.7 | 674 | 93.8 | 647 | 4.0 |
| 86/14 | 94.3 | 650 | 85.1 | 587 | 9.8 |
| 87/13 | 93.4 | 644 | 83.1 | 573 | 11.0 |
| 40/60 | 99.0 | 683 | 96.3 | 664 | 2.7 |
| 30/70 | 97.5 | 672 | 92.0 | 634 | 5.6 |
| 15/85 | 93.5 | 645 | 87.2 | 601 | 6.7 |
| 1/99 | 86.4 | 596 | 85.8 | 592 | 0.7 |
| 218E2/isobutane | | | | | |
| 83.6/16.4 | 53.5 | 369 | 53.5 | 369 | 0.0 |
| 90/10 | 53.3 | 367 | 53.3 | 367 | 0.0 |
| 99/1 | 52.5 | 362 | 52.5 | 362 | 0.0 |
| 60/40 | 52.8 | 364 | 52.8 | 364 | 0.0 |
| 40/60 | 52. | 359 | 51.9 | 358 | 0.2 |
| 20/80 | 51.2 | 353 | 51.1 | 352 | 0.2 |
| 1/99 | 50.5 | 348 | 50.5 | 348 | 0.0 |
| 227caEαβ/N(CF$_3$)$_3$ | | | | | |
| 35.1/64.9 | 48. | 331 | 48. | 331 | 0.0 |
| 15/85 | 47.3 | 326 | 47.2 | 325 | 0.2 |
| 1/99 | 46. | 317 | 45.9 | 316 | 0.2 |
| 60/40 | 47.1 | 325 | 46.9 | 323 | 0.4 |
| 80/20 | 45.1 | 311 | 44.5 | 307 | 1.3 |
| 99/1 | 41.6 | 287 | 41.5 | 286 | 0.2 |
| 227caEαβ/DME | | | | | |
| 4.7/95.3 | 85.7 | 591 | 85.7 | 591 | 0.0 |
| 1/99 | 85.7 | 591 | 85.7 | 591 | 0.0 |
| 40/60 | 84.4 | 582 | 83.9 | 578 | 0.6 |
| 60/40 | 81.5 | 562 | 79.4 | 547 | 2.6 |
| 80/20 | 73.8 | 509 | 66.7 | 460 | 9.6 |
| 81/19 | 73.1 | 504 | 65.6 | 452 | 10.3 |
| 227caEβγ/DME | | | | | |
| 49.5/50.5 | 93.2 | 643 | 93.2 | 643 | 0.0 |
| 80/20 | 87.9 | 606 | 81.7 | 563 | 7.1 |
| 83/17 | 86.0 | 593 | 77.8 | 536 | 9.5 |
| 84/16 | 85.3 | 588 | 76.3 | 526 | 10.6 |
| 20/80 | 90.8 | 626 | 89.1 | 614 | 1.9 |
| 1/99 | 86.1 | 594 | 85.8 | 592 | 0.3 |
| 227caEβγ/isobutane | | | | | |
| 39.1/60.9 | 50.6 | 349 | 50.6 | 349 | 0.0 |
| 60/40 | 50.5 | 348 | 50.5 | 348 | 0.0 |
| 80/20 | 50.1 | 345 | 50.1 | 345 | 0.0 |
| 90/10 | 49.6 | 342 | 49.6 | 342 | 0.0 |
| 99/1 | 48.8 | 336 | 48.8 | 336 | 0.0 |
| 20/80 | 50.6 | 349 | 50.6 | 349 | 0.0 |
| 10/90 | 50.5 | 348 | 50.5 | 348 | 0.0 |
| 1/99 | 50.5 | 348 | 50.5 | 348 | 0.0 |
| 227caEβγ/N(CF$_3$)$_3$ | | | | | |
| 80.0/20.0 | 48.9 | 337 | 48.9 | 337 | 0.0 |
| 90/10 | 48.9 | 336 | 48.8 | 336 | 0.0 |
| 99/1 | 48.7 | 336 | 48.7 | 336 | 0.0 |
| 60/40 | 48.7 | 336 | 48.7 | 336 | 0.0 |
| 40/60 | 48.2 | 332 | 48.2 | 332 | 0.0 |
| 20/80 | 47.3 | 326 | 47.2 | 325 | 0.2 |
| 1/99 | 45.9 | 316 | 45.9 | 316 | 0.0 |
| 227eaE/DME | | | | | |
| 52.9/47.1 | 95.1 | 656 | 95.1 | 656 | 0.0 |
| 20/80 | 92.0 | 634 | 89.3 | 616 | 2.9 |
| 1/99 | 86.2 | 594 | 85.8 | 592 | 0.5 |
| 80/20 | 90.6 | 625 | 85.0 | 586 | 6.2 |
| 84/16 | 88.1 | 607 | 79.8 | 550 | 9.4 |
| 85/15 | 87.3 | 602 | 78.2 | 539 | 10.4 |
| 227eaE/isobutane | | | | | |
| 80.9/19.1 | 51.8 | 357 | 51.8 | 357 | 0.0 |
| 99/1 | 51.3 | 354 | 51.3 | 354 | 0.0 |
| 60/40 | 51.5 | 355 | 51.5 | 355 | 0.0 |
| 40/60 | 51.2 | 353 | 51.2 | 353 | 0.0 |

-continued

| WT % A/WT % B | INITIAL | | 50% LEAK | | DELTA |
|---|---|---|---|---|---|
| | PSIA | KPA | PSIA | KPA | % P |
| 20/80 | 50.8 | 350 | 50.8 | 350 | 0.0 |
| 1/99 | 50.5 | 348 | 50.5 | 348 | 0.0 |
| 236caE/ | | | | | |
| N(CHF$_2$)$_2$(CF$_3$) | | | | | |
| 16.2/83.8 | 14. | 97 | 14. | 97 | 0.0 |
| 1/99 | 13.9 | 96 | 13.9 | 96 | 0.0 |
| 40/60 | 13.9 | 96 | 13.9 | 96 | 0.0 |
| 70/30 | 13.5 | 93 | 13.5 | 93 | 0.8 |
| 90/10 | 13.2 | 91 | 13.1 | 90 | 0.8 |
| 99/1 | 13. | 90 | 12.9 | 89 | 0.8 |
| E42-11mcEγδ/ | | | | | |
| HFC-245ca | | | | | |
| 1/99 | 14.7 | 101 | 14.7 | 101 | 0.2 |
| 10/90 | 15.0 | 104 | 14.9 | 103 | 0.5 |
| 20/80 | 15.2 | 105 | 15.2 | 105 | 0.1 |
| 26.0/74.0 | 15.2 | 105 | 15.2 | 105 | 0.0 |
| 30/70 | 15.2 | 105 | 15.2 | 105 | 0.1 |
| 40/60 | 15.1 | 104 | 15.0 | 103 | 0.6 |
| 50/50 | 14.9 | 102 | 14.6 | 100 | 2.0 |
| 60/40 | 14.5 | 100 | 13.8 | 95 | 4.6 |
| 70/30 | 13.8 | 95 | 12.6 | 87 | 8.6 |
| E42-11mcEγδ/ | | | | | |
| HFC-245cb | | | | | |
| 99/1 | 8.5 | 59 | 8.2 | 56 | 4.4 |
| 98/2 | 9.0 | 61.8 | 8.3 | 56.9 | 7.9 |
| 73/27 | 14.3 | 99 | 12.7 | 88 | 11.1 |
| 70/30 | 14.6 | 101 | 13.2 | 91 | 9.5 |
| 50/50 | 15.8 | 109 | 15.4 | 106 | 2.5 |
| 30/70 | 16.3 | 112 | 16.2 | 112 | 0.3 |
| 15.7/84.3 | 16.4 | 113 | 16.4 | 113 | 0 |
| 1/99 | 16.3 | 112 | 16.3 | 112 | 0 |

The results of this Example show that these compositions are azeotropic or azeotrope-like because when 50 wt. % of an original composition is removed, the vapor pressure of the remaining composition is within about 10% of the vapor pressure of the original composition, at a temperature of 25° C.

EXAMPLE 3

Impact of Vapor Leakage at 0° C.

A leak test is performed on compositions of 218E2 and DME at the temperature of 0° C. The results are summarized below.

| WT % A/WT % B | INITIAL | | 50% LEAK | | DELTA % P |
|---|---|---|---|---|---|
| | PSIA | KPA | PSIA | KPA | |
| 218E2/DME | | | | | |
| 59.9/40.1 | 45.4 | 313 | 45.4 | 313 | 0.0 |
| 70/30 | 45.2 | 312 | 44.8 | 309 | 0.9 |
| 84/16 | 43.3 | 299 | 39.5 | 272 | 8.8 |
| 85/15 | 43.0 | 296 | 38.6 | 266 | 10.2 |
| 40/60 | 44.9 | 310 | 43.7 | 301 | 2.7 |
| 20/80 | 43.2 | 298 | 39.7 | 274 | 8.1 |
| 15/85 | 42.5 | 293 | 39.2 | 270 | 7.8 |
| 1/99 | 39.0 | 269 | 38.7 | 267 | 0.8 |

These results show that compositions of 218E2 and DME are azeotropic or azeotrope-like at different temperatures, but that the weight percents of the components vary as the temperature is changed.

EXAMPLE 4

Refrigerant Performance

The following table shows the performance of various refrigerants. The data are based on the following conditions.

| | |
|---|---|
| Evaporator temperature | 48.0° F. (8.9° C.) |
| Condenser temperature | 115.0° F. (46.1° C.) |
| Subcooled | 12.0° F. (6.7° C.) |
| Return gas temperature | 65.0° F. (18.3° C.) |
| Compressor efficiency is | 75%. |

The refrigeration capacity is based on a compressor with a fixed displacement of 3.5 cubic feet per minute and 75% volumetric efficiency. Capacity is intended to mean the change in enthalpy of the refrigerant in the evaporator per pound of refrigerant circulated, i.e. the heat removed by the refrigerant in the evaporator per time. Coefficient of performance (COP) is intended to mean the ratio of the capacity to compressor work. It is a measure of refrigerant energy efficiency.

| Refrig. Comp. | Evap. Press. Psia (kPa) | Cond. Press. Psia (kPa) | Comp. Dis. Temp. °F.(°C.) | COP | Capacity BTU/min (kw) |
|---|---|---|---|---|---|
| HCFC-22 | 95(655) | 258(1779) | 183(83.9) | 4.60 | 397(7.0) |
| 116E/cyclopropane | | | | | |
| 5.0/95.0 | 69(476) | 184(1269) | 173(78.3) | 4.92 | 302(5.3) |
| 96.9/3.1* | 95(655) | 335(2310) | 122(50) | 2.78 | 277(4.9) |
| 99.0/1.0* | 98(676) | 331(2282) | 117(47.2) | 2.88 | 284(5) |
| *90/10/15/30/0.75 | | | | | |
| 116E/DME | | | | | |
| 5.0/95.0 | 54(372) | 155(1069) | 166(74.4) | 4.99 | 256(4.5) |
| 93.9/6.1 | 166(1145) | 405(2792) | 138(58.9) | 3.60 | 436(7.7) |
| 99.0/1.0* | 97(669) | 343(2365) | 121(49.4) | 2.68 | 271(4.8) |
| *90/10/15/30/0.75 | | | | | |
| 116E/propylene | | | | | |
| 5.0/95.0 | 112(772) | 283(1951) | 159(70.6) | 4.52 | 411(7.2) |

-continued

| Refrig. Comp. | Evap. Press. Psia (kPa) | Cond. Press. Psia (kPa) | Comp. Dis. Temp. °F.(°C.) | COP | Capacity BTU/min (kw) |
|---|---|---|---|---|---|
| 89.3/10.7* | 101(696) | 344(2372) | 125(51.7) | 2.84 | 294(5.2) |
| 99.0/1.0* | 101(696) | 352(2427) | 121(49.4) | 2.66 | 277(4.9) |
| *90/10/15/30/0.75 | | | | | |
| 134E/C-225eEαβ | | | | | |
| 5.0/95.0 | 18(124) | 59(407) | 131(55) | 4.83 | 91(1.6) |
| 35.6/64.4 | 18(124) | 60(414) | 138(58.9) | 4.88 | 93(1.6) |
| 95.0/5.0 | 16(110) | 58(400) | 153(67.2) | 4.95 | 92(1.6) |
| 134aE/C-216E2 | | | | | |
| 5.0/95.0 | 47(324) | 138(951) | 121(49.4) | 4.36 | 186(3.3) |
| 27.8/72.2 | 46(317) | 138(951) | 126(52.2) | 4.47 | 193(3.4) |
| 95.0/5.0 | 44(303) | 136(938) | 143(61.7) | 4.67 | 201(3.5) |
| 134aE/227eaE | | | | | |
| 5.0/95.0 | 31(214) | 102(703) | 125(51.7) | 4.48 | 141(2.5) |
| 94.0/6.0 | 44(303) | 135(931) | 143(61.7) | 4.66 | 200(3.5) |
| 99.0/1.0 | 44(303) | 135(931) | 144(62.2) | 4.68 | 201(3.5) |
| 134aE/DME | | | | | |
| 5.0/95.0 | 51(352) | 149(1027) | 167(75) | 4.88 | 240(4.2) |
| 36.7/63.3 | 53(365) | 153(1055) | 161(71.7) | 4.82 | 242(4.3) |
| 95.0/5.0 | 46(317) | 141(972) | 146(63.3) | 4.7 | 211(3.7) |
| 134aE/N(CF$_3$)$_3$ | | | | | |
| 5.0/95.0 | 29(200) | 95(655) | 120(48.9) | 4.38 | 128(2.3) |
| 71.8/28.2 | 45(310) | 137(945) | 137(58.3) | 4.56 | 197(3.5) |
| 95.0/5.0 | 45(310) | 136(938) | 143(61.7) | 4.65 | 201(3.5) |
| 143aE/C-216E | | | | | |
| 1.0/99.0 | 59(407) | 165(1138) | 124(51.1) | 4.18 | 211(3.7) |
| 3.8/96.2 | 60(414) | 168(1158) | 124(51.1) | 4.18 | 216(3.8) |
| 95.0/5.0 | 52(359) | 153(1055) | 145(62.8) | 4.69 | 230(4) |
| 143aE/C-216E2 | | | | | |
| 5.0/95.0 | 47(324) | 140(965) | 121(49.4) | 4.35 | 189(3.3) |
| 60.3/39.7 | 51(352) | 150(1034) | 137(58.3) | 4.6 | 218(3.8) |
| 95.0/5.0 | 51(352) | 150(1034) | 145(62.8) | 4.69 | 225(4) |
| 143aE/218E | | | | | |
| 5.0/95.0 | 54(372) | 161(1110) | 124(51.1) | 4.08 | 199(3.5) |
| 39.3/60.7 | 62(427) | 179(1234) | 132(55.6) | 4.3 | 238(4.2) |
| 95.0/5.0 | 52(359) | 153(1055) | 145(62.8) | 4.69 | 229(4) |
| 143aE/218E2 | | | | | |
| 5.0/95.0 | 35(241) | 114(786) | 121(49.4) | 4.2 | 145(2.6) |
| 73.8/26.2 | 50(345) | 149(1027) | 139(59.4) | 4.59 | 217(3.8) |
| 95.0/5.0 | 51(352) | 150(1034) | 145(62.8) | 4.68 | 224(3.9) |
| 143aE/227caE | | | | | |
| 5.0/95.0 | 32(221) | 104(717) | 126(52.2) | 4.48 | 144(2.5) |
| 92.9/7.1 | 50(345) | 149(1027) | 145(62.8) | 4.68 | 223(3.9) |
| 99.0/1.0 | 51(352) | 149(1027) | 146(63.3) | 4.7 | 225(4) |
| 143aE/DME | | | | | |
| 5.0/95.0 | 51(352) | 149(1027) | 167(75) | 4.87 | 240(4.2) |
| 58.9/41.1 | 54(372) | 157(1082) | 157(69.4) | 4.80 | 245(4.3) |
| 95.0/5.0 | 51(352) | 152(1048) | 148(64.4) | 4.71 | 230(4) |
| 143aE/N(CF$_3$)$_3$ | | | | | |
| 5.0/95.0 | 30(207) | 98(676) | 120(48.9) | 4.41 | 133(2.3) |
| 71.0/29.0 | 52(359) | 152(1048) | 139(59.4) | 4.57 | 221(3.9) |
| 95.0/5.0 | 51(352) | 151(1041) | 145(62.8) | 4.67 | 225(4) |
| 218E/DME | | | | | |
| 5.0/95.0 | 54(372) | 154(1062) | 165(73.9) | 4.98 | 253(4.5) |
| 75.5/24.5 | 80(552) | 219(1510) | 138(58.9) | 4.30 | 294(5.2) |
| 95.0/5.0 | 63(434) | 184(1269) | 127(52.8) | 4.13 | 231(4.1) |
| 218E/propylene | | | | | |
| 5.0/95.0 | 109(752) | 277(1910) | 159(70.6) | 4.5 | 401(7.1) |
| 40.1/59.9 | 107(738) | 275(1896) | 152(66.7) | 4.37 | 381(6.7) |
| 95.0/5.0 | 63(434) | 185(1276) | 128(53.3) | 4.16 | 233(4.1) |
| 218E2/DME | | | | | |
| 5.0/95.0 | 52(359) | 151(1041) | 166(74.4) | 4.89 | 2.43(4.3) |

-continued

| Refrig. Comp. | Evap. Press. Psia (kPa) | Cond. Press. Psia (kPa) | Comp. Dis. Temp. °F.(°C.) | COP | Capacity BTU/min (kw) |
|---|---|---|---|---|---|
| 60.9/39.1 | 61(421) | 174(1200) | 142(61.1) | 4.59 | 254(4.5) |
| 95.0/5.0 | 41(283) | 133(917) | 121(49.4) | 4.31 | 173(3) |
| 218E2/isobutane | | | | | |
| | | | | | |
| 5.0/95.0 | 31(214) | 90(621) | 134(56.7) | 4.78 | 138(2.4) |
| 5.09756 | 31(214) | 100(689) | 121(49.4) | 4.44 | 137(2.4) |
| 95.0/5.0 | 32(221) | 104(717) | 117(47.2) | 4.26 | 135(2.4) |
| 227caEαβ/N(CF$_3$)$_3$ | | | | | |
| | | | | | |
| 5.0/95.0 | 27(186) | 88(607) | 118(47.8) | 4.33 | 116(2) |
| 35.1/64.9 | 26(179) | 85(586) | 118(47.8) | 4.37 | 114(2) |
| 95.0/5.0 | 24(165) | 80(552) | 119(48.3) | 4.45 | 110(1.9) |
| 227caEαβ/DME | | | | | |
| | | | | | |
| 5.0/95.0 | 52(359) | 150(1034) | 166(74.4) | 4.88 | 241(4.2) |
| 4.7/95.3 | 52(359) | 150(1034) | 166(74.4) | 4.88 | 241(4.2) |
| 95.0/5.0 | 31(214) | 101(696) | 124(51.1) | 4.67 | 145(2.6) |
| 227caEβγ/DME | | | | | |
| | | | | | |
| 5.0/95.0 | 52(359) | 150(1034) | 166(74.4) | 4.88 | 242(4.3) |
| 49.5/50.5 | 57(393) | 163(1124) | 152(66.7) | 4.72 | 250(4.4) |
| 95.0/5.0 | 36(248) | 115(793) | 129(53.9) | 4.61 | 164(2.9) |
| 227caEβγ/isobutane | | | | | |
| | | | | | |
| 5.0/95.0 | 31(214) | 90(621) | 134(56.7) | 4.79 | 138(2.4) |
| 39.1/60.9 | 30(207) | 90(621) | 133(56.1) | 4.74 | 137(2.4) |
| 95.0/5.0 | 29(200) | 93(641) | 125(51.7) | 4.53 | 131(2.3) |
| 227caEβγ/N(CF$_3$)$_3$ | | | | | |
| | | | | | |
| 5.0/95.0 | 27(186) | 88(607) | 118(47.8) | 4.33 | 117(2.1) |
| 80.0/20.0 | 28(193) | 93(641) | 123(50.6) | 4.46 | 127(2.2) |
| 95.0/5.0 | 29(200) | 93(641) | 124(51.1) | 4.48 | 129(2.3) |
| 227caE/DME | | | | | |
| | | | | | |
| 5.0/95.0 | 52(359) | 150(1034) | 166(74.4) | 4.88 | 242(4.3) |
| 52.9/47.1 | 58(400) | 166(1145) | 150(65.6) | 4.7 | 251(4.4) |
| 95.0/5.0 | 38(262) | 119(820) | 129(53.9) | 4.59 | 170(3) |
| 227caE/isobutane | | | | | |
| | | | | | |
| 5.0/95.0 | 31(214) | 90(621) | 134(56.7) | 4.79 | 138(2.4) |
| 80.9/19.1 | 30(207) | 94(648) | 128(533) | 4.61 | 136(2.4) |
| 95.0/5.0 | 30(207) | 97(669) | 125(51.7) | 4.51 | 136(2.4) |
| 236caE/N(CHF$_2$)$_2$(CF$_3$) | | | | | |
| | | | | | |
| 5.0/95.0 | 7(48) | 29(200) | 128(53.3) | 4.84 | 43(0.8) |
| 16.2/83.8 | 7(48) | 29(200) | 129(53.9) | 4.85 | 43(0.8) |
| 95.0/5.0 | 7(48) | 27(186) | 133(56.1) | 4.91 | 41(0.7) |

EXAMPLE 5

Refrigerant Performance

The following table shows the performance of a refrigerant mixture. The data are based on the following conditions.

| | |
|---|---|
| Evaporator temperature | 40.0° F.(4.4° C.) |
| Condenser temperature | 100° F.(37.8° C.) |
| Return gas temperature | 40.0° F.(4.4° C.) |
| Compressor efficiency is 75%. | |
| No subcooling or superheat. | |

| Refrig. Comp. | Evap. Press. Psia (kPa) | Cond. Press. Psia (kPa) | Comp. Dis. Temp. °F.(°C.) | COP | Capacity BTU/min (kw) |
|---|---|---|---|---|---|
| CFC-11 | 6.9(48) | 23.5(162) | 133(56.1) | 5.63 | 43.6(0.8) |
| E42-11mcEγδ/HFC-245ca | | | | | |
| | | | | | |
| 26.0/74.0 | 6.4(44) | 24.3(168) | 102(38.9) | 5.32 | 40.0(0.7) |
| 5/95 | 6.2(43) | 23.7(163) | 108(42.2) | 5.38 | 40.0(0.7) |

-continued

| E42-11meEγδ/HFC-245eb | | | | | |
|---|---|---|---|---|---|
| 15.7/84.3 | 6.7(46) | 26.3(181) | 111(43.9) | 5.26 | 43.2(0.8) |
| 5/95 | 6.7(46) | 26.3(181) | 115(46.1) | 5.28 | 43.3(0.8) |

EXAMPLE 6

This Example is directed to measurements of the liquid/vapor equilibrium curves for the mixtures in FIGS. 1–27.

Turning to FIG. 1, the upper curve represents the composition of the liquid, and the lower curve represents the composition of the vapor.

The data for the compositions of the liquid in FIG. 1 are obtained as follows. A stainless steel cylinder is evacuated, and a weighed mount of 116E is added to the cylinder. The cylinder is cooled to reduce the vapor pressure of 116E, and then a weighed amount of cyclopropane is added to the cylinder. The cylinder is agitated to mix the 116E and cyclopropane, and then the cylinder is placed in a constant temperature bath until the temperature comes to equilibrium at 25° C., at which time the vapor pressure of the 116E and cyclopropane in the cylinder is measured. Additional samples of liquid are measured the same way, and the results are plotted in FIG. 1.

The curve which shows the composition of the vapor is calculated using an ideal gas equation of state.

Vapor/liquid equilibrium data are obtained in the same way for the mixtures shown in FIGS. 2–27.

The data in FIGS. 1–27 show that at 25° C., there are ranges of compositions that have vapor pressures higher than the vapor pressures of the pure components of the composition at that same temperature. As stated earlier, the higher than expected pressures of these compositions may result in an unexpected increase in the refrigeration capacity or efficiency of those compositions when compared to the pure components of the compositions.

EXAMPLE 7

Figure 28:
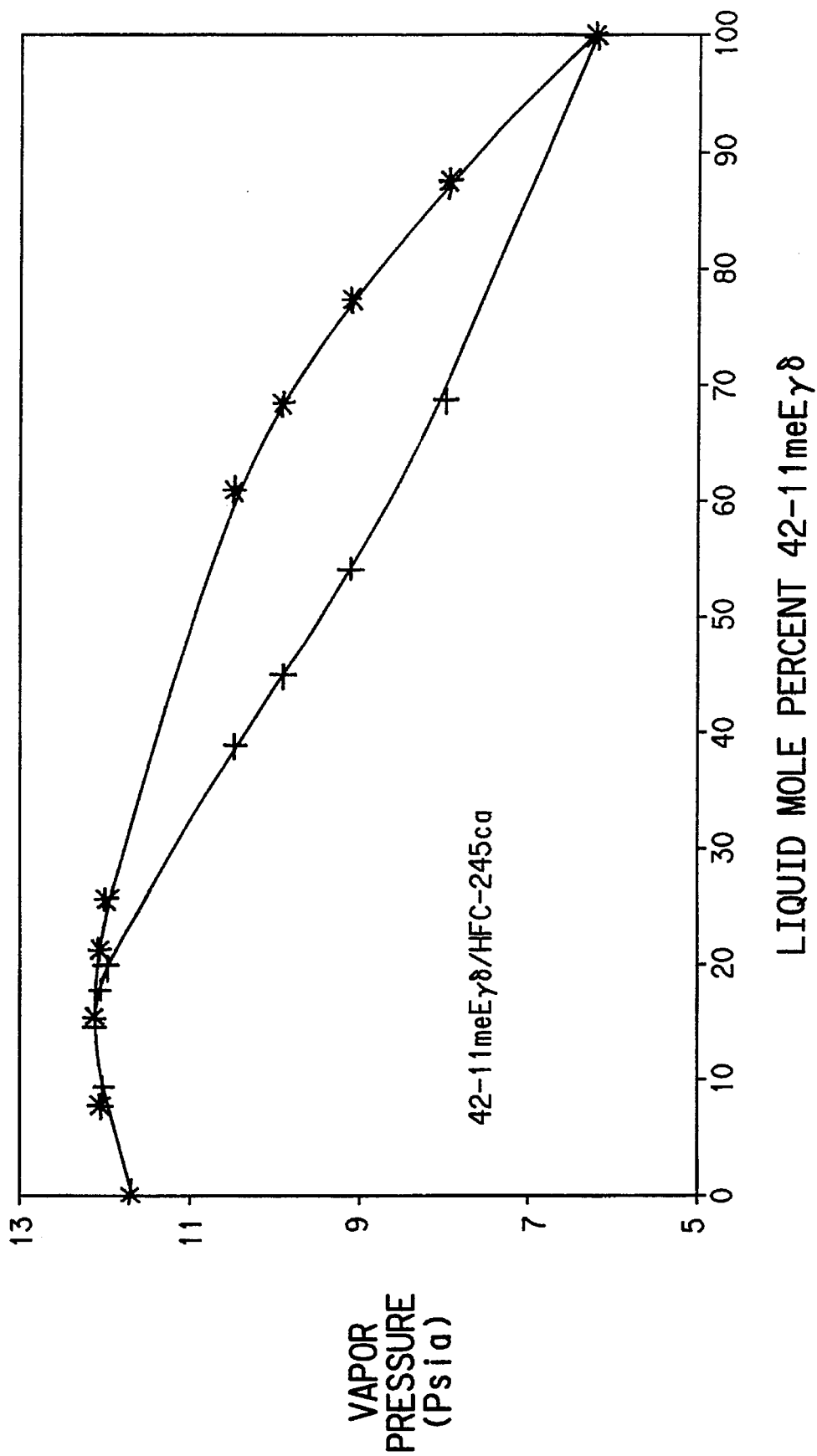
FIG. 28 is a graph of the vapor/liquid equilibrium curve for mixtures of E-42-11meEγδ and HFC-245ca at 19.05° C.
Figure 29:
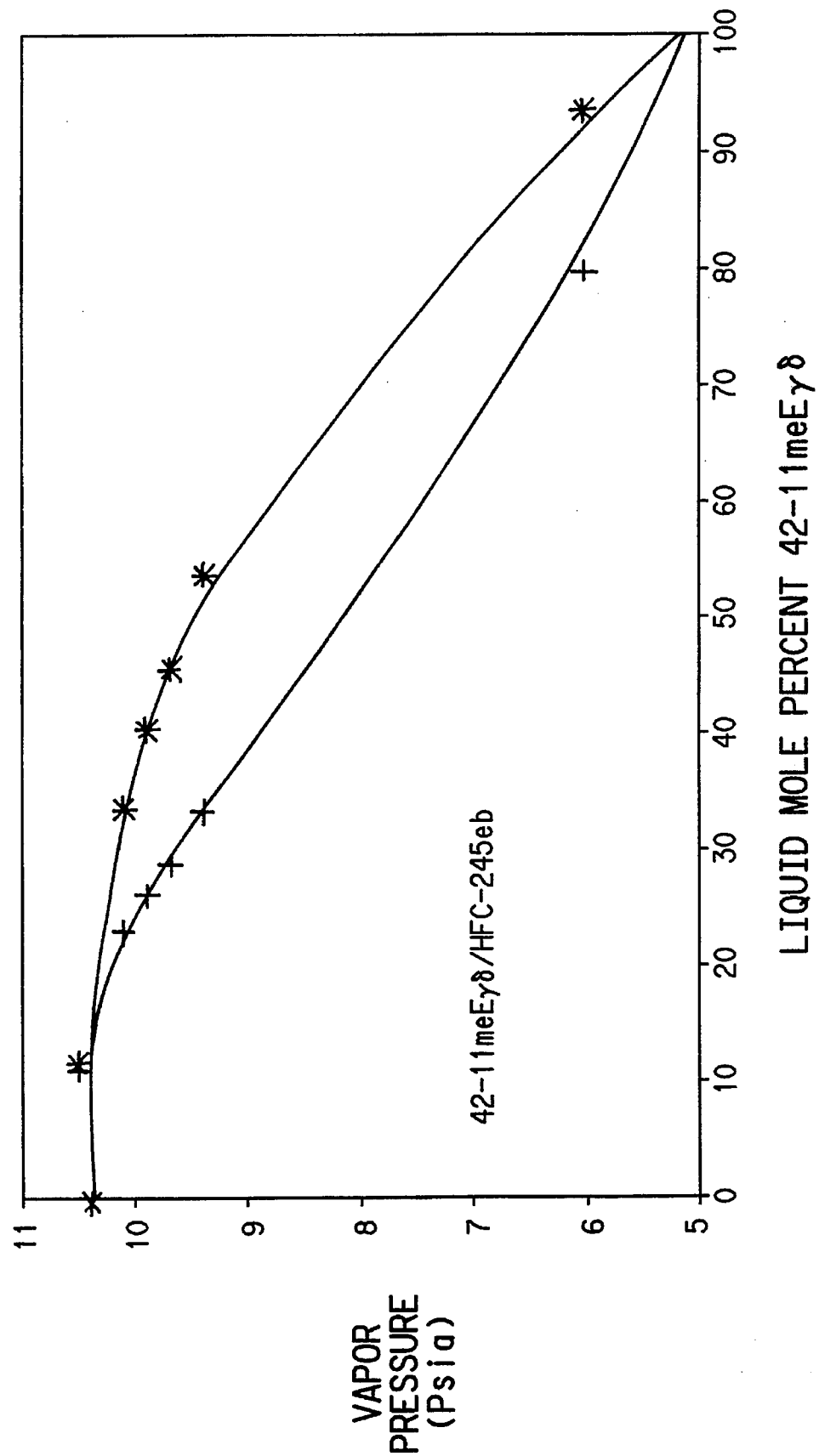
FIG. 29 is a graph of the vapor/liquid equilibrium curve for mixtures of E-42-11meEγδ and HFC-245eb at 14.14° C.

This Example is directed to measurements of the liquid/vapor equilibrium curve for mixtures of E-42-11meEγδ and HFC-245ca and E-42-11meEγδ and HFC-245eb. The liquid/vapor equilibrium data for these mixtures are shown in FIGS. 28 and 29. The upper curve represents the liquid composition, and the lower curve represents the vapor composition.

The procedure for measuring the composition of the liquid for mixtures of E-42-11meEγδ/HFC-245ca in FIG. 28 was as follows. A stainless steel cylinder was evacuated, and a weighed amount of E-42-11-meEγδ was added to the cylinder. The cylinder was cooled to reduce the vapor pressure of E-42-11-meEγδ, and then a weighed amount of HFC-245ca was added to the cylinder. The cylinder was agitated to mix the E-42-11-meEγδ and HFC-245ca, and then the cylinder was placed in a constant temperature bath until the temperature came to equilibrium at 19.05° C., at which time the vapor pressure of the content of the cylinder was measured. Samples of the liquid in the cylinder were taken and analyzed, and the results are plotted in FIG. 28 as asterisks, with a best fit curve having been drawn through the asterisks.

This procedure was repeated for various mixtures of E-42-11-meEγδ/ HFC-245ca as indicated in FIG. 28.

The curve which shows the composition of the vapor is calculated using an ideal gas equation of state.

The data in FIG. 28 show that at 19.05° C., there are ranges of compositions that have vapor pressures higher than the vapor pressures of the pure components of the composition at that same temperature.

The procedure for measuring the vapor pressure of mixtures of E-42-11-meEγδ/ HFC-245ca were carried out in the same way for mixtures of E-42-11-meEγδ/HFC-245eb, except that the measurements of the vapor pressure of mixtures of E-42-11-meEγδ/ HFC-245eb were taken at 14.14° C.

The novel compositions of this invention, including the azeotropic or azeotrope-like compositions, may be used to produce refrigeration by condensing the compositions and thereafter evaporating the condensate in the vicinity of a body to be cooled. The novel compositions may also be used to produce heat by condensing the refrigerant in the vicinity of the body to be heated and thereafter evaporating the refrigerant.

The novel compositions of the invention are particularly suitable for replacing refrigerants that may affect the ozone layer, including R-11, R-12, R-22, R-114 and R-502.

In addition to refrigeration applications, the novel constant boiling or substantially constant boiling compositions of the invention are also useful as aerosol propellants, heat transfer media, gaseous dielectrics, fire extinguishing agents, expansion agents for polyolefins and polyurethanes and power cycle working fluids.

ADDITIONAL COMPOUNDS

Other components, such as aliphatic hydrocarbons having a boiling point of –60 to +60° C., hydrofluorocarbonalkanes having a boiling point of –60 to 60° C., hydrofluoropropanes having a boiling point of between –60 to +60° C., hydrocarbon esters having a boiling point between –60 to +60° C., hydrochlorofluorocarbons having a boiling point between –60 to +60° C., hydrofluorocarbons having a boiling point of –60 to +60° C., hydrochlorocarbons having a boiling point between –60 to +60° C., chlorocarbons and perfluorinated compounds, can be added to the azeotropic or azeotrope-like compositions described above without substantially changing the properties thereof, including the constant boiling behavior, of the compositions.

Additives such as lubricants, corrosion inhibitors, surfactants, stabilizers, dyes and other appropriate materials may be added to the novel compositions of the invention for a variety of purposes provides they do not have an adverse influence on the composition for its intended application. Preferred lubricants include esters having a molecular weight greater than 250.

We claim:

1. An azeotropic or azeotrope-like composition consisting essentially of about 1–99 weight percent fluoromethyl trifluoromethyl ether and about 1–99 weight percent dimethyl ether wherein at a vapor pressure of about 74.6–85.8 psia and when the temperature has been adjusted to about 25° C., the vapor pressure of the composition does not change by more than 10 percent after 50 percent of the initial composition has evaporated.

2. The composition of claim 1 consisting essentially of about 20–99 weight percent fluoromethyl trifluoromethyl ether and about 1–80 weight percent dimethyl ether wherein when the temperature has been adjusted to about 25° C., the vapor pressure of the composition does not change by more than 10 percent after 50 percent of the initial composition has evaporated.

3. An azeotropic or azeotrope-like composition consisting essentially of about 1–60 weight percent fluoromethyl trifluoromethyl ether and about 99–40 weight percent dimethyl ether wherein when the temperature has been adjusted to 25° C., said composition forms a binary composition having a vapor pressure higher than either compound of the binary composition.

4. A process for producing refrigeration, comprising condensing a composition of claim 1 or 2 and thereafter evaporating said composition in the vicinity of the body to be cooled.

5. A process for producing heat comprising condensing a composition of claim 1 or 2 in the vicinity of a body to be heated, and thereafter evaporating said composition.

6. A processing for producing refrigeration, comprising condensing a composition of claim 3 and thereafter evaporating said composition in the vicinity of the body to be cooled.

7. A process for producing heat comprising condensing a composition of claim 3 in the vicinity of a body to be heated, and thereafter evaporating said composition.

* * * * *